United States Patent
Olson et al.

(10) Patent No.: US 12,093,209 B2
(45) Date of Patent: *Sep. 17, 2024

(54) STREAMING BATCHER FOR COLLECTING WORK PACKETS AS REMOTE DESCRIPTORS

(71) Applicant: NVIDIA Corporation, Santa Clara, CA (US)

(72) Inventors: Ryan Olson, Golden, CO (US); Michael Demoret, Denver, CO (US); Bartley Richardson, Alexandria, VA (US)

(73) Assignee: Nvidia Corporation, Santa Clara, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/862,227

(22) Filed: Jul. 11, 2022

(65) Prior Publication Data

US 2024/0022625 A1  Jan. 18, 2024

Related U.S. Application Data

(60) Provisional application No. 63/346,501, filed on May 27, 2022.

(51) Int. Cl.
*G06F 15/167* (2006.01)
*G06F 9/30* (2018.01)
(Continued)

(52) U.S. Cl.
CPC ...... *G06F 15/17331* (2013.01); *G06F 9/3004* (2013.01); *H04L 67/025* (2013.01); *H04L 67/1097* (2013.01)

(58) Field of Classification Search
CPC ............. H04L 67/025; H04L 67/1097; G06F 15/17331; G06F 9/3004
See application file for complete search history.

(56) References Cited

U.S. PATENT DOCUMENTS 5,713,044 A * 1/1998 Gillespie ................ G06F 13/28
710/22
5,960,464 A  9/1999 Lam
(Continued)

FOREIGN PATENT DOCUMENTS

CN    103034559 A    4/2013
CN    105393239 A    3/2016
(Continued)

OTHER PUBLICATIONS

Office Action for German Patent Application No. 102023205954.1, mailed May 27, 2024, 8 Pages.

*Primary Examiner* — Duyen M Doan
(74) *Attorney, Agent, or Firm* — Lowenstein Sandler LLP

(57) ABSTRACT

Technologies for batching remote descriptors of serialized objects in streaming pipelines are described. One method of a first computing device generates a streaming batch of remote descriptors. Each remote descriptor uniquely identifies a contiguous block of a serialized object. The first computing device sends at least one of the remote descriptors to a second computing device before the streaming batch is completed. At least some contents of a contiguous block are obtained for storage at a second memory associated with the second computing device before the streaming batch is completed.

24 Claims, 21 Drawing Sheets

(51) Int. Cl.
*G06F 15/173* (2006.01)
*H04L 67/025* (2022.01)
*H04L 67/1097* (2022.01)

(56) References Cited

U.S. PATENT DOCUMENTS

| | | | |
|---|---|---|---|
| 7,162,476 | B1 | 1/2007 | Belair et al. |
| 7,177,941 | B2 | 2/2007 | Biran et al. |
| 7,243,284 | B2 | 7/2007 | Machulsky et al. |
| 7,245,627 | B2 | 7/2007 | Goldenberg et al. |
| 7,733,875 | B2 | 6/2010 | Biran et al. |
| 7,760,741 | B2 | 7/2010 | Biran et al. |
| 7,761,619 | B2 * | 7/2010 | Feng ............. H04L 69/16 710/33 |
| 8,225,182 | B2 | 7/2012 | Kagan et al. |
| 8,255,475 | B2 | 8/2012 | Kagan et al. |
| 8,365,057 | B2 | 1/2013 | Goldenberg et al. |
| 8,645,663 | B2 | 2/2014 | Kagan et al. |
| 8,745,276 | B2 | 6/2014 | Bloch et al. |
| 8,811,417 | B2 | 8/2014 | Bloch et al. |
| 8,914,458 | B2 | 12/2014 | Raindel et al. |
| 9,143,467 | B2 | 9/2015 | Kagan et al. |
| 9,298,642 | B2 | 3/2016 | Kagan et al. |
| 9,639,464 | B2 | 5/2017 | Eran et al. |
| 9,696,942 | B2 | 7/2017 | Kagan et al. |
| 9,727,503 | B2 | 8/2017 | Kagan et al. |
| 9,934,173 | B1 * | 4/2018 | Sakalley ........... G06F 13/4068 |
| 10,031,857 | B2 | 7/2018 | Menachem et al. |
| 10,110,518 | B2 | 10/2018 | Burstein et al. |
| 10,120,832 | B2 | 11/2018 | Raindel et al. |
| 10,210,125 | B2 | 2/2019 | Burstein |
| 10,430,374 | B2 | 10/2019 | Menachem et al. |
| 10,496,595 | B2 | 12/2019 | Degani et al. |
| 11,079,969 | B1 | 8/2021 | Glimcher et al. |
| 11,449,272 | B1 * | 9/2022 | Springberg ........... G06F 3/061 |
| 2003/0065856 | A1 | 4/2003 | Kagan et al. |
| 2005/0071677 | A1 | 3/2005 | Khanna et al. |
| 2005/0268047 | A1 | 12/2005 | Aslot et al. |
| 2006/0168306 | A1 | 7/2006 | Makhervaks et al. |
| 2009/0157995 | A1 | 6/2009 | Kalmuk et al. |
| 2011/0173287 | A1 | 7/2011 | Blocksome |
| 2012/0023304 | A1 | 1/2012 | Chan et al. |
| 2013/0097615 | A1 | 4/2013 | Falco et al. |
| 2014/0143365 | A1 | 5/2014 | Guerin et al. |
| 2015/0280972 | A1 | 10/2015 | Sivan et al. |
| 2016/0065659 | A1 | 3/2016 | Bloch et al. |
| 2016/0077946 | A1 | 3/2016 | Raikin et al. |
| 2016/0170910 | A1 * | 6/2016 | Inamdar ............ H04L 49/901 711/163 |
| 2016/0294983 | A1 | 10/2016 | Kliteynik et al. |
| 2017/0063613 | A1 | 3/2017 | Bloch et al. |
| 2018/0052803 | A1 | 2/2018 | Graham et al. |
| 2018/0095906 | A1 | 4/2018 | Doshi et al. |
| 2018/0349396 | A1 | 12/2018 | Blagojevic et al. |
| 2019/0089641 | A1 | 3/2019 | Shattah et al. |
| 2019/0141041 | A1 | 5/2019 | Bhabbur et al. |
| 2019/0188181 | A1 | 6/2019 | Degani |
| 2019/0259025 | A1 | 8/2019 | Hilton et al. |
| 2019/0278701 | A1 | 9/2019 | Enz et al. |
| 2019/0294582 | A1 | 9/2019 | Zhu et al. |
| 2020/0012534 | A1 | 1/2020 | Tørudbakken et al. |
| 2020/0089648 | A1 | 3/2020 | Klein |
| 2020/0117383 | A1 | 4/2020 | Kondiles et al. |
| 2020/0314181 | A1 | 10/2020 | Eran et al. |
| 2020/0401540 | A1 | 12/2020 | Birsan et al. |
| 2021/0081271 | A1 | 3/2021 | Doshi et al. |
| 2021/0174237 | A1 | 6/2021 | Mentovich et al. |
| 2021/0181963 | A1 | 6/2021 | Choi et al. |
| 2021/0263664 | A1 | 8/2021 | Glimcher et al. |
| 2021/0342230 | A1 | 11/2021 | Niles et al. |
| 2021/0382846 | A1 | 12/2021 | Miller et al. |
| 2022/0004488 | A1 | 1/2022 | Paul et al. |
| 2022/0045844 | A1 | 2/2022 | Menes et al. |
| 2022/0121361 | A1 | 4/2022 | Kamran et al. |
| 2022/0138140 | A1 | 5/2022 | Santan et al. |
| 2022/0147453 | A1 | 5/2022 | Kounavis et al. |
| 2023/0305747 | A1 | 9/2023 | Subramanian et al. |

FOREIGN PATENT DOCUMENTS

| | | |
|---|---|---|
| EP | 3974998 A2 | 3/2022 |
| WO | 0118988 A1 | 3/2001 |

* cited by examiner ically, to enable RDMA technology, and more specifically, to batch remote descriptors to enable RDMA transport of serialized objects in streaming pipelines. For example, at least one embodiment pertains to processors or computing systems used to provide a streaming batch of multiple remote descriptors where at least some contents of a serialized object are obtained from a first memory for storage at a second memory before the streaming batch is completed, according to various novel techniques described herein.

STREAMING BATCHER FOR COLLECTING WORK PACKETS AS REMOTE DESCRIPTORS

RELATED APPLICATIONS

This application claims the benefit of U.S. Provisional Application No. 63/346,501, filed May 27, 2022, the entire contents of which are incorporated by reference. This application is related to co-pending U.S. application Ser. No. 17/862,222, filed concurrently, entitled "REMOTE DESCRIPTOR TO ENABLE REMOTE DIRECT MEMORY ACCESS (RDMA) TRANSPORT OF A SERIALIZED OBJECT," and co-pending U.S. application Ser. No. 17/862,234, filed concurrently, entitled "REMOTE PROMISE AND REMOTE FUTURE FOR DOWNSTREAM COMPONENTS TO UPDATE UPSTREAM STATES."

TECHNICAL FIELD

At least one embodiment pertains to processing resources used to perform and facilitate network communications. For example, at least one embodiment pertains to remote direct memory access technology, and more specifically, to enable remote direct memory access (RDMA) transport of serialized objects in streaming pipelines. For example, at least one embodiment pertains to processors or computing systems used to provide remote descriptors to enable RDMA transport of serialized objects, according to various novel techniques described herein.

At least one embodiment pertains to processing resources used to perform and facilitate network communications. For example, at least one embodiment pertains to remote direct memory access technology and, more specifically, to batch remote descriptors to enable RDMA transport of serialized objects in streaming pipelines. For example, at least one embodiment pertains to processors or computing systems used to provide a streaming batch of multiple remote descriptors where at least some contents of a serialized object are obtained from a first memory for storage at a second memory before the streaming batch is completed, according to various novel techniques described herein.

At least one embodiment pertains to processing resources used to perform and facilitate network communications. For example, at least one embodiment pertains to RDMA technology, and more specifically, to enable downstream nodes to obtain data from upstream storage and downstream nodes to PUSH data to upstream nodes while those upstream nodes yield their execution context and consume no resources until the downstream PUSH operation is completed. For example, at least one embodiment pertains to processors or computing systems used to provide a remote promise object that uniquely identifies a first serialized object and is released when a second streaming object is provided back, according to various novel techniques described herein.

BACKGROUND

Remote direct memory access (RDMA) technology enables network adapters to transfer data over a network directly to (or from) the memory of a remote device without storing data in data buffers of the operating system of the remote device. Advantages of RDMA include reduced computations and caching by processing devices, e.g., central processing units (CPUs), elimination of the need to copy the data between various network layers, convenient discretization of transmitted data, and so on. RDMA transactions are supported by a number of communication protocols, including RDMA over Converged Ethernet (RoCE), which facilitates RDMA operations using conventional standard Ethernet infrastructure, Internet Wide Area RDMA Protocol (iWARP), which facilitates RDMA operations using Transmission Control Protocol (TCP), and InfiniBand™, which provides native support for RDMA operations. RDMA transactions are especially useful in cloud computing applications and numerous applications that require high data transmission rates and low latency.

In the context of a streaming data pipeline, data can be collected by one or more sensors and sent to the streaming data pipeline for processing. A streaming data pipeline can have multiple stages. Some streaming data pipelines can implement all stages on a same physical machine having a computing device and local memory. Other streaming data pipelines implement different stages on two or more different physical machines. However, when implementing the streaming data pipeline on multiple physical machines, raw data has to be transferred in bulk over a network connection across machine boundaries. The data objects can be stored in local memory of a first machine and serialized for transport to be stored in local memory of a second machine. In the context of streaming data pipelines, moving this raw data through the network connection at every physical machine boundary can incur some measurable costs in terms of data throughput, especially because of the potential size of the data objects being transferred.

BRIEF DESCRIPTION OF THE SEVERAL VIEWS OF THE DRAWINGS

Various embodiments in accordance with the present disclosure will be described with reference to the drawings, in which.

DETAILED DESCRIPTION

Figure 1:
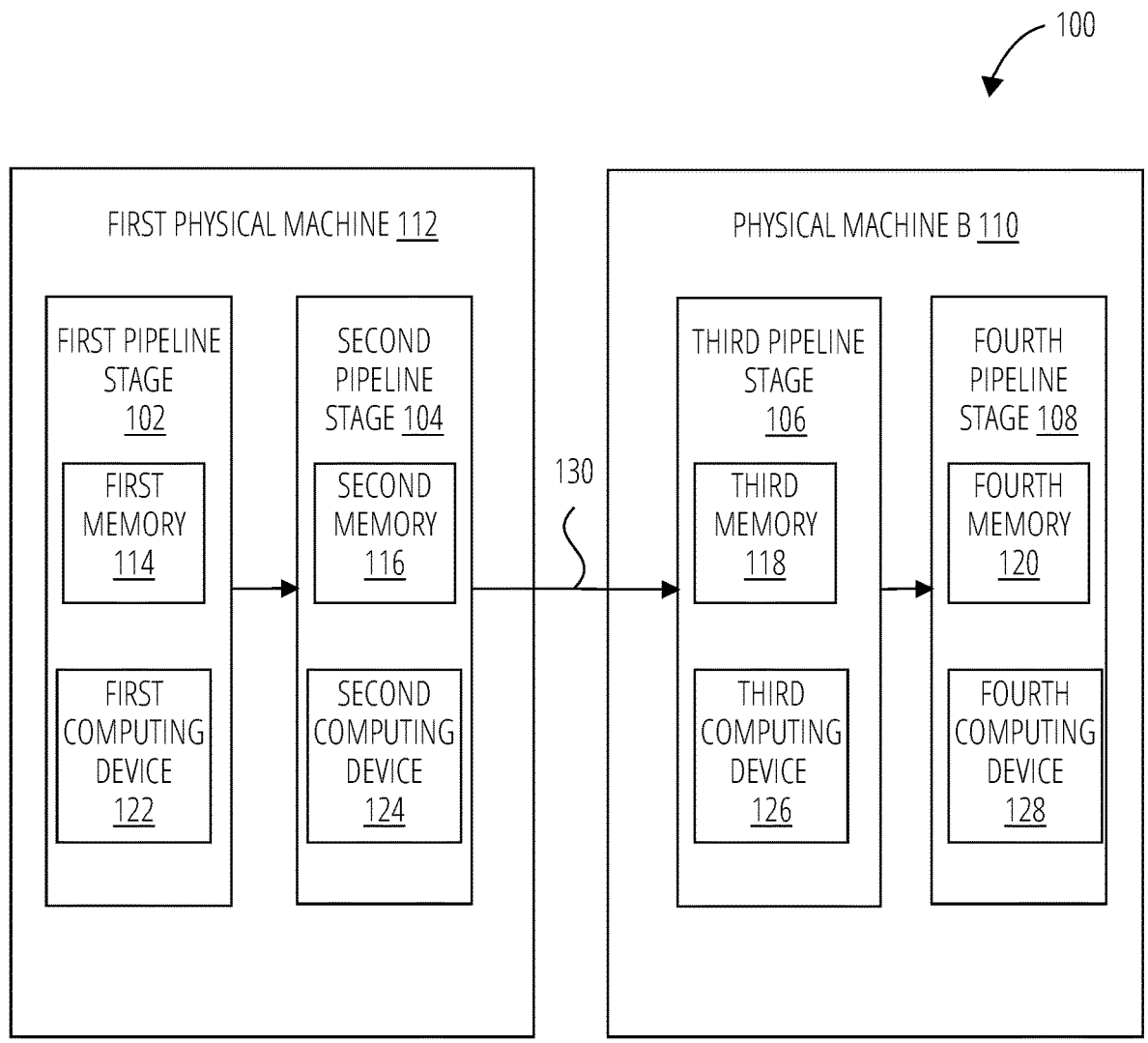
FIG. 1 is a block diagram of an example system architecture, according to at least one embodiment.

As described above, when streaming data pipelines are implemented on multiple physical machines, there can be a measurable cost in terms of data throughput moving raw data across machine boundaries when using conventional approaches.

Aspects and embodiments of the present disclosure address the above and other deficiencies by providing a remote descriptor to enable RDMA transport of a serialized object. The remote descriptor is a language construct or a control structure that can uniquely identify a location of the serialized object in a data center. Instead of moving the actual data to each pipeline stage, the remote descriptor can be moved to each stage of the pipeline. The remote descriptor can be a set of one or more remote descriptor types, including, for examples, a memory descriptor (MemoryDescriptor), a metadata descriptor (MetaDataDescriptor), a packed descriptor (PackedDescriptor), data descriptor (EagerDataDescriptor), or the like. One type of remote descriptor is the memory descriptor that refers to an object that uniquely identifies a starting address of a contiguous block in local memory, a size of the contiguous block, a physical machine identifier corresponding to the local memory, an RDMA access key, and a value of a reference count token representing one or more shares of ownership of a serialized object. The memory descriptor can include at least a starting address, a size, and any remote access keys required for RDMA. The metadata descriptor can include a user-defined message, which can be serialized to a small block of contiguous memory. The data descriptor can be a serialized blob of bytes. The packed descriptor can allow multiple small object blocks of data to be packed into a single contiguous block where the packed descriptor describes the offsets into the contiguous region. These types of remote descriptors, and others, can be used by a user to define the object's representation, such as set forth in the following two examples.

In a first example, a Tensor of floating point values might have dimension of 3 with a shape of {3, 256, 256} and an optional stride that is similar in format to the shape. A remote descriptor of this Tensor can use a i) single memory descriptor with the starting address of the contiguous block of floating points and size, which might be larger than 3*256*256*sizeof(float) if the strides are not compact, and ii) a single specialized TensorMetaData Descriptor that holds the data_type, shape and optional stride.

In a second example, a ComplexTensor of complex floating point values of the same shape above, might be laid out in memory by two separate memory allocation (separate contiguous blocks of memory) such that the real part and and imaginary part require a separate MemoryDesscriptors. In this case, there are two memory descriptors and 1 TensorMetaData Descriptor to define the object's representation.

The remote descriptor can provide a language-level construct similar to std::future in the RDMA library that enables the RDMA transport of the serialized object. The remote descriptors are frequently less than 600 bytes (e.g., 64 bytes), whereas the serialized objects they reference tend to be several orders of magnitude larger. Remote descriptors can greatly reduce data transport across machine boundaries in streaming data pipelines by eliminating the need for bulk data transfers at every boundary and shifting that to an on-demand model, where the request for the bulk data can be issued only when and where it is needed to be used. The on-demand model can allow the remote descriptors rather than the serialized object to flow through the multiple stages of the pipeline without incurring the transfer cost of the object. Then only when needed, the requesting node in the on-demand model can enable asynchronous PULL operations to obtain the object from local memory on a remote note (another physical machine) for transfer to the local memory of the requesting node. In the context of streaming pipelines, moving the remote descriptors, instead of the raw data, through the pipeline can increase data throughput.

One approach to managing network communications is to batch individual work packets into a batch. Conventional batching algorithms build up individual work packets into a collection in three forms: 1) collecting a fixed count of work packets, regardless of time; 2) collecting work packets over a window of time; or 3) a combined count and time windowing approach. Conventional batching algorithms include a blocking stall in the algorithm in the event that data for a batch is not satisfied. Conventional batchers are typically external entities to the data plane and require the full data payload to be collected and forwarded, resulting in at least a doubling of the data movement across machine boundaries.

Aspects and embodiments of the present disclosure address the above and other deficiencies by providing a streaming batch of multiple remote descriptors to enable RDMA transport of serialized objects in streaming pipelines. Streaming batch refers to a set of one or more slots that each can be assigned a remote descriptor. The streaming batch is completed when i) all slots of the streaming batch are assigned or ii) the batching window ends (e.g., expiration of a timer corresponding to the streaming batch), whichever occurs first. As described herein, at least some contents of a serialized object can be obtained from a first memory for storage at a second memory before the streaming batch is completed. Aspects and embodiments of a streaming batcher can solve the problem of conventional batchers by 1) collecting work packets (batch items) as remote descriptors, reducing the need for large amounts of data to be moved while batching), and 2) immediately forwarding the remote descriptors to their downstream consumers (also referred to as downstream targets) before a timing window (also referred to as a batching window) is completed. Streaming batcher refers to processing logic that can be hardware, firmware, software, or any combination thereof that can generate, manage, and send a streaming batch with one or more remote descriptors, where each remote descriptor uniquely identifies a location of a serialized object in a data center. Batching window refers to an amount of time allotted to complete a streaming batch. The streaming batch is completed when i) all slots of the streaming batch are assigned or ii) the batching window ends (e.g., expiration of a timer corresponding to the streaming batch), whichever occurs first. By batching remote descriptors, the streaming batcher helps reduce the cost of duplicate large data transfers by logically batching the remote descriptors rather than the actual data (serialized objects). By forwarding the incoming work packets (batch items) to the intended downstream target immediately upon arrival, the downstream target can instantiate a PULL operation to obtain the remote data identified in the remote descriptor while the batching window is still open (i.e., not completed). Aspects and embodiments of the present disclosure can reduce the data movement by orders of magnitudes by batching and transferring the remote descriptors rather than the serialized objects. Aspects and embodiments of the present disclosure can decrease the overall latency by applying an overlap in obtaining the remote data with a windowing of the streaming batcher.

Stateful streaming pipelines can be challenging when downstream consumers need to update their upstream state. Without the concept of a remote promise object and a remote promise-future object, these stateful algorithms either need to be refactored to be stateless or incur a serialization bottleneck that can impact performance.

Aspects and embodiments of the present disclosure address the above and other deficiencies by providing a remote promise object and a remote promise-future object to enable downstream nodes to obtain or retrieve data (e.g., using a PULL operation or a GET operation) from upstream storage and downstream nodes to send data (e.g., using a PUSH operation or PUT operation) to upstream nodes while those upstream nodes yield their execution context and consume no resources until the downstream PUSH operation is completed. A remote promise object is an object that uniquely identifies a contiguous block in memory where a serialized object is stored. The remote promise object identifies a starting address of a contiguous block in local memory, a size of the contiguous block, a physical machine identifier corresponding to the local memory, an RDMA access key, and a value of a reference count token representing a unique ownership of the serialized object since the remote promise object is unique. The remote promise object is a language construct or a control structure that can be exchanged with another computing device that can complete the remote promise object providing a message back to the device sending the remote promise object.

Aspects and embodiments of the present disclosure can provide a remote promise object that uniquely identifies a first serialized object and is released when a second streaming object is provided back. The remote promise object/ remote promise-future object constructs can provide language-level constructs similar to std::promise and std:future, enabling the upstream PUSH/PUT operations to send the data and the indication that an upstream node can continue to progress. The remote promise object/remote promise-future object constructs are the remote descriptor's conceptual counterpart. The remote descriptors can enable the downstream node to obtain data (e.g., PULL data) from upstream storage, and the remote promise object/remote promise-future object constructs enable downstream nodes to send data (e.g., PUSH/PUT operation) to upstream nodes while those upstream nodes yield their execution context and consume no resources until the downstream PUSH/PUT operation is complete.

Remote Descriptors

The following section describes embodiments related to generating, sending, and processing remote descriptors to enable RDMA transport of a serialized object in streaming pipelines implemented with multiple computing devices in a data center.

FIG. 1 is a block diagram of an example system architecture of a computing system 100, according to at least one embodiment. A computing system refers to a system that includes multiple physical machines with one or more computing devices, one or more additional devices, such as a memory device, a peripheral device, a storage device, a network device, or any combination thereof. A computing device refers to any processing device, such as a processor, a central processing unit (CPU), a graphics processing unit (GPU), a data processing unit (DPU), a field-programmable gate array (FPGA), an application-specific integrated circuit (ASIC), a programmable device, or the like.

The computing system 100 can be a data center including two or more physical machines, including a first physical machine 112 and a physical machine B 110. A data center refers to a facility with one or more physical machines having one or more computing devices, network devices, memory and storage devices, and the like. A data center can provide systems for data collection, data processing, data storage, communications, or the like. The computing system 100 is configured to implement a streaming pipeline with multiple pipeline stages. The first physical machine 112 includes a first pipeline stage 102 and a second pipeline stage 104. Physical machine B 110 includes a third pipeline stage 106 and a fourth pipeline stage 108. There can be more than two physical machines and more than four pipeline stages in other embodiments. The computing system 100 can include additional physical machine boundaries between the pipeline stages. For example, each pipeline stage could be implemented on a separate physical machine. The first physical machine 112 includes a first computing device 122 and a first memory 114 for implementing the first pipeline stage 102. The physical machine B 110 includes a second computing device 124 and a second memory 116 for implementing the second pipeline stage 104. The first computing device 122 and the second computing device 124 can be the same underlying computing device of the first physical machine 112. The first memory 114 and the second memory 116 can be the same underlying memory of the first physical machines 112.

During operation, the first pipeline stage 102 can perform one or more operations using the first computing device 122. The first computing device 122 can store a serialized object in the first memory 114. After completing one or more operations in the first pipeline stage 102, the second pipeline stage 104 can perform one or more operations on the serialized object using the second first computing device 122. The serialized object can be stored in a second memory 116 for performing the operations by the second pipeline stages 104. In another, the serialized object is stored in the same memory (first memory 114 or second memory 116) for both the first pipeline stage 102 and the second pipeline stage 104 without moving the data between two memories. In other embodiments, the first and second memories 114, 116 represent different regions of a same memory, the different regions being dedicated to the respective pipeline stages.

After completing the one or more operations in the second pipeline stage 104, the second pipeline stage 104 can generate and send remote descriptors over a network connection 130 (e.g., a network fabric coupled between physical machines of a data center) to a physical machine B 110, instead of sending the serialized object. Network fabric refers to a network topology in which components exchange data through interconnecting switches. A network fabric can include hubs, switches, adapters, cables, or the like, to support communication between devices. The serialized object can remain in the second memory 116 (or first memory 114 in some cases). For example, for a serialized object, the second computing device 124 can generate a remote descriptor that is an object that uniquely identifies a location of the serialized object in the second memory 116. The remote descriptor can include a starting address of a contiguous block in the second memory 116. A contiguous block refers to a set of memory locations in a memory having consecutive addresses that can be assigned or allocated to an object. The remote descriptor can include a size of the contiguous block. The remote descriptor can include a first physical machine identifier that identifies the first physical machine 112. The first physical machine identifier identifies the machine in which the second memory 116 is located. The remote descriptor can include an RDMA access key. This allows a downstream consumer of the remote descriptor, i.e., the third computing device 126 of the third pipeline stage 106, to have access to the location of the serialized object when obtained. The remote descriptor can include a reference count token, also referred to as a life-cycle count. Reference count token refers to a parameter of the remote descriptor that specifies a value representing a share of ownership. The reference count token can indicate a remaining life cycle of the remote descriptor. The value of the reference count token can represent a number of shares of ownership of the serialized object. For example, if the remote descriptor is shared with two downstream consumers, the value of the reference count token would be two. When the remote descriptors are completed, the value of the reference count token can be updated (e.g., decremented). When the value of the reference count token satisfies a threshold value (e.g., zero), the serialized object can be released from the second memory 116.

Once the remote descriptor is generated, the second computing device 124 can send the remote descriptor to the third computing device 126 over the network connection 130. The third computing device 126 can process the remote descriptor to identify where to obtain the serialized object. In at least one embodiment, the third computing device 126 can perform an RDMA GET operation over the network connection 130 to obtain the contents.

The third computing device 126, using the remote descriptor, can obtain the contents of the contiguous block from the second memory 116 (or the first memory 114) to the third memory 118 associated with the third computing device 126. Once the contents of the contiguous block from the second memory 116 are obtained, the third computing device 126 can send a message to the second computing device 124 to release the remote descriptor. In at least one embodiment, the second computing device 124 can receive the message from the third computing device 126. Responsive to receiving the message, the second computing device 124 can update a value (e.g., decrement) of the reference count token in the remote descriptor. Responsive to the value of the reference count token satisfying a threshold value (e.g., zero), the second computing device 124 can release the serialized object from the second memory 116 (or the first memory 114).

As described above, a size of the remote descriptor is less than a size of the contiguous block of the serialized object. In this manner, the actual data is not transferred over the network connection until the third computing device 126 is ready to process the serialized object. At that point, the third computing device 126 can use the remote descriptor to obtain the contents of the serial object over the network connection 130.

In a further embodiment, the third computing device 126 can receive a second remote descriptor associated with a second serialized object over the network connection 130. The second remote descriptor can be received from the first computing device 122, the second computing device 124, or from another computing device of another physical machine in the data center. The second remote descriptor is a second object that uniquely identifies a second starting address of a second contiguous block in the first memory 114 or the second memory 116 associated with the first physical machine 112, a second size of the second contiguous block, a second physical machine identifier associated with the first physical machine 112, a second RDMA access key, and a value of a second reference count token representing one or more shares of ownership of the second serialized object. Using the second remote descriptor, the third computing device s 126 performs an RDMA GET operation to obtain the contents of the second contiguous block from the third memory for transfer to the first memory over the network connection 130.

In at least one embodiment, the third computing device 126 sends a second message to the upstream node (e.g., second computing device 124) over the network connection 130 to release the second remote descriptors. The value of the second reference count token is updated in response to the second message. In response to the value of the second reference count token satisfying a threshold value (e.g., equaling zero), the second serialized object is released from the local memory in which the second serialized object is located.

In another embodiment, the third computing device 126 receives a second remote descriptor associated with a second serialized object over the network connection 130 (e.g., network fabric). The second remote descriptor is a second object that uniquely identifies a second starting address of a second contiguous block in the second memory 116 associated with the second computing device 124 in the data center, a second size of the second contiguous block, a second physical machine identifier corresponding to the second computing device 124, a second RDMA access key, and a value of a second reference count token representing one or more shares of ownership of the second serialized object. The third computing device 126 can send the second remote descriptor to a fourth computing device 128. In some cases, the fourth computing device 128 resides in the same physical machine as the third computing device 126. In other cases, the fourth computing device 128 is on a separate physical machine, and the third computing device 126 can send the second remote descriptor to the fourth computing device 128 over a second network connection (e.g., the network fabric). Sending the second remote descriptor to the fourth computing device 128 transfers full ownership of the second serialized object to the fourth computing device 128.

In another embodiment, the third computing device 126 receives the second remote descriptor described above and generates a set of remote descriptors from the second remote descriptor. In this embodiment, the value of the second reference count token is split among the set of remote descriptors. For example, if the value of the second reference count token is two and the third computing device 126 generates two remote descriptors, the value of each of the reference count tokens of the two remote descriptors will be set to one. An example of a remote descriptor is illustrated below with respect to FIG. 2.

Figure 2:
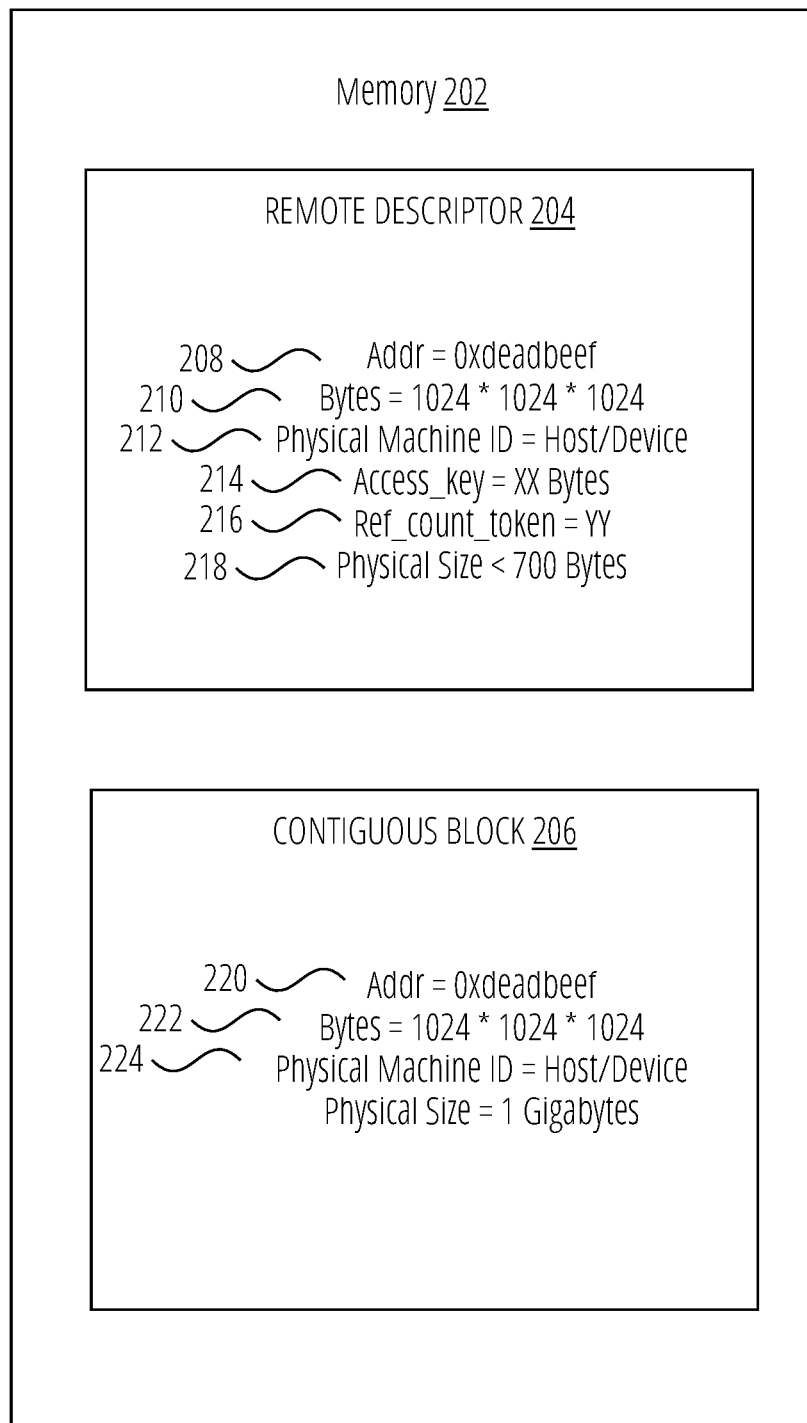
FIG. 2 is a block diagram of a memory storing a remote descriptor and a contiguous block, according to at least one embodiment.

FIG. 2 is a block diagram of a memory 202 storing a remote descriptor 204 and a contiguous block 206, according to at least one embodiment. The memory 202 can be any of the memories described above with respect to FIG. 1, including the first memory 114, second memory 116, third memory 118, or fourth memory 120. The remote descriptor 204 is an object that uniquely identifies or describes the contiguous block 206. The remote descriptor 204 can include multiple elements to uniquely identify a location of a serialized object within a connected data center. That is, the memory 202 is accessible via a network connection, such as via a network fabric, by any of the computing devices in the data center subject to access controls. The remote descriptor 204 includes a starting address 208 of the contiguous block 206, a size 210 of the contiguous block 206 (e.g., in bytes), a physical machine identifier 212 corresponding to the physical machine in which the memory 202 is located (e.g., a host identifier, a device identifier), an RDMA access key 214, a reference count token 216.

In at least one embodiment, the remote descriptor 204 is generated and stored at a location that is the same as the contiguous block 206 that it describes. That is, the remote descriptor 204 is generated and stored in the same memory 202 as the contiguous block 206. As noted above, the remote descriptor 204 describes or identifies the contiguous block 206 of the serialized object. The contiguous block 206 includes a starting address 220 that is the same value as the starting address 208, a size 222 of the contiguous block 206 that is the same value as the size 210, and a physical machine identifier 224 that is the same value as the physical machine identifier 212. The remote descriptor 204 has a size 218 that is typically less than 600 bytes, depending on the size of the RDMA access key 214. For example, the size 218 can be 128-512 bytes or less than 128 bytes. In another example, the size 218 can be 64 bytes. Alternatively, the size 218 can be other values. The serialized object stored at the contiguous block 206, however, has a physical size 222 (as noted in the size 210 of the remote descriptor 204) that can be larger, even several orders of magnitude larger (e.g., 1 gigabyte) than the size 218 of the remote descriptor 204. The remote descriptor 204 provides a language-level construct similar to std::future in the RDMA library that enables the RDMA transport of the serialized object from the contiguous block 206. The remote descriptor 204 reduces the transport of the data across a machine boundary in a streaming data pipeline by eliminating the need for bulk data transfers at every machine boundary. The remote descriptor 204 allows the streaming data pipeline to be an on-demand model, where a request for the and shifting that to an on-demand model, where the request for the bulk data is issued only when and where it is needed to be used. The on-demand model allows the remote descriptor 204, rather than the serialized object, to flow through the multiple stages of the streaming pipeline without incurring the transfer cost of the serialized object. Then, only when needed, the on-demand model enables asynchronous PULL operations to retrieve the serialized object from memory 202 on the other machine. In the context of streaming pipelines, moving the remote descriptor 204, instead of the raw data, through the pipeline can increase data throughput.

In at least one embodiment, once generated, the remote descriptor 204 can be passed to any physical machine on the secure data center network fabric. The physical machine receiving the remote descriptor 204 can issue an RDMA GET operation to obtain the contents of the contiguous block 206 (i.e., remote memory for transfer to the receiving physical machine) to the physical machine's local memory (i.e., the local memory of the receiving physical machine). The remote descriptor 204 gets deconstructed by the receiving physical machine, and the receiving physical machine can send a message to the physical machine in which the memory 202 is located, as described in remote descriptor 204. The physical machine in which the memory 202 is located can receive the message and update the reference count token 216. Once the reference count token 216 goes to zero, the contiguous block 206 storing the serialized object can be released.

Figure 3A:
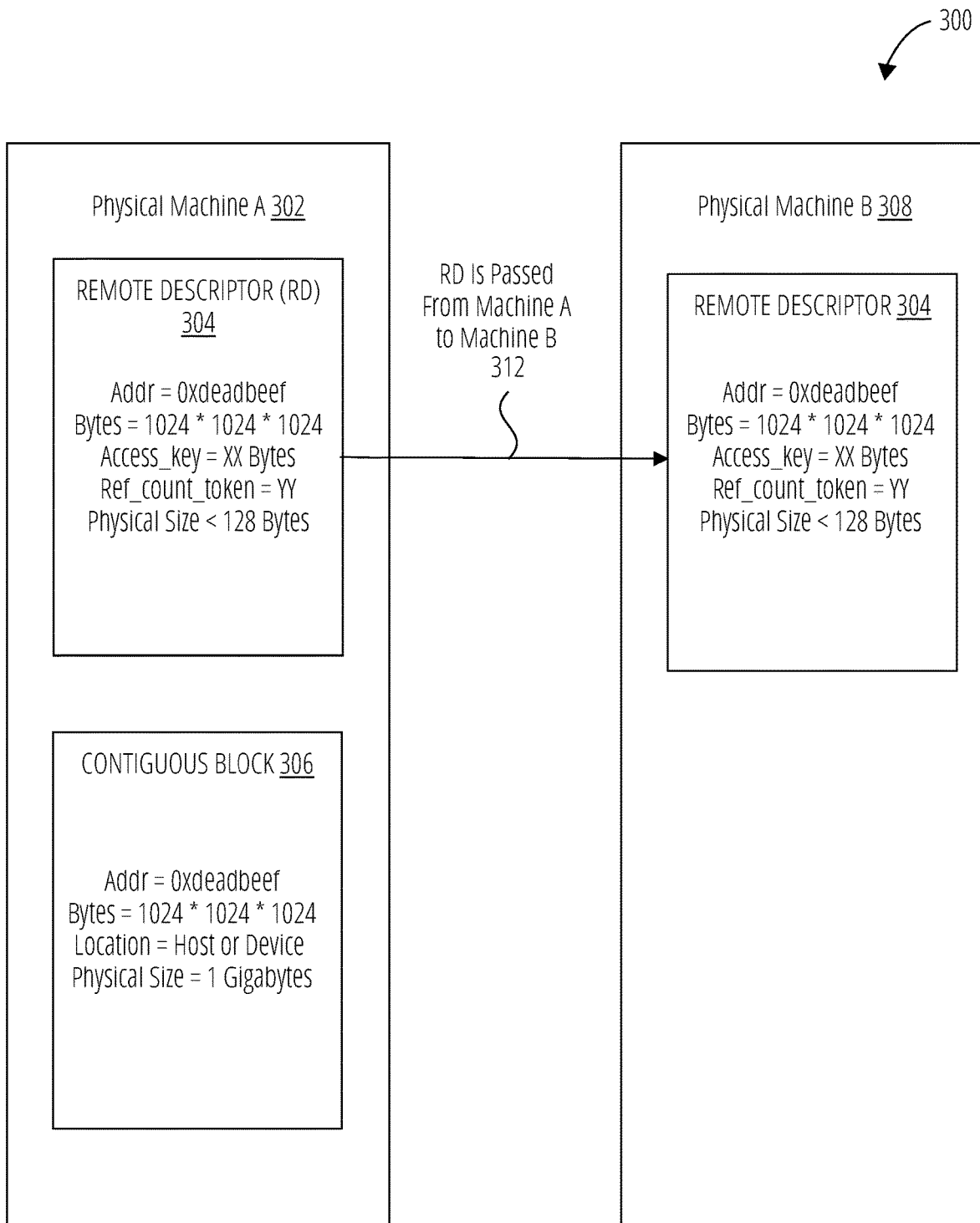
FIG. 3A illustrates a remote descriptor generated by a first physical machine and sent to a second physical machine in a data center, according to at least one embodiment.

FIG. 3A illustrates a remote descriptor 304 generated by a first physical machine and sent to a second physical machine in a data center 300, according to at least one embodiment. The data center 300 includes a physical machine A 302 and a physical machine B 308. The physical machine A 302 generates the remote descriptor 304 that uniquely identifies a serialized object stored at contiguous block 306.

The remote descriptor 304 describes or identifies the contiguous block 306 in which a serialized object is stored. The remote descriptor 304 includes a starting address of the contiguous block 306, a size of the contiguous block 306 (e.g., in bytes), a physical machine identifier corresponding to the physical machine A 302 in which the contiguous block 306 is located (e.g., a host identifier, a device identifier), an RDMA access key, and a reference count token. The contiguous block 306 includes a starting address that is the same value as the starting address described in the remote descriptor 304, a size of the contiguous block 306 that is the same value as the size described in the remote descriptor 304, and a physical machine identifier that is the same value as the physical machine identifier described in the remote descriptor 304. The remote descriptor 304 has a size that is less than a size of the serialized object.

As illustrated in FIG. 3A, the physical machine A 302 sends the remote descriptor 304 to the physical machine B 308 (operation 312) instead of the contiguous block 306. The physical machine B 308 can process the remote descriptor 304 on demand, as illustrated and described below with respect to FIG. 3B.

Figure 3B:
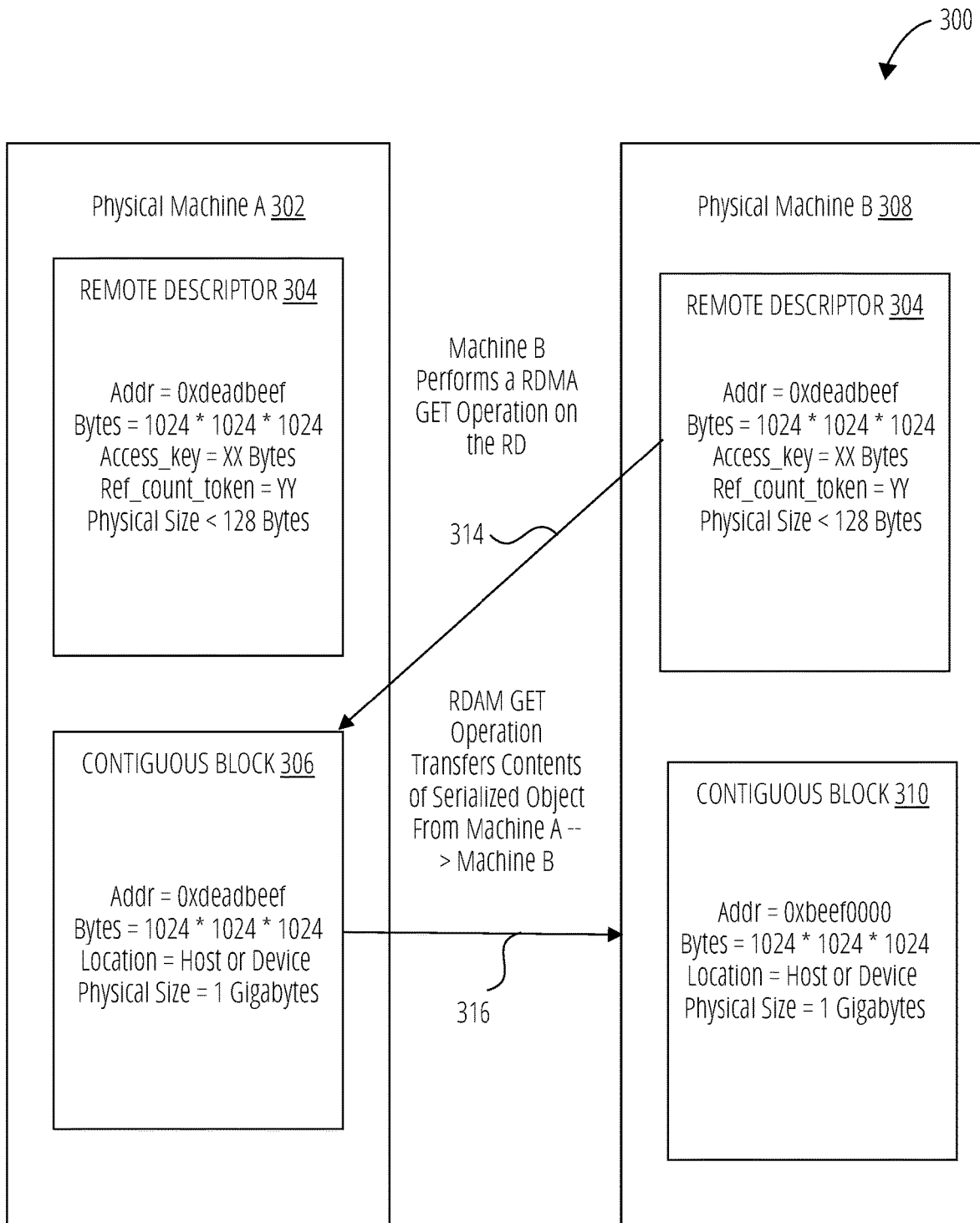
FIG. 3B illustrates the second physical machine performing an RDMA GET operation on the remote descriptor of FIG. 3A, according to at least one embodiment.

FIG. 3B illustrates the second physical machine performing an RDMA GET operation on the remote descriptor 304 of FIG. 3A, according to at least one embodiment. After the physical machine B 308 receives the remote descriptor 304, the physical machine B 308 can deconstruct the remote descriptor 304 to identify where the serialized object is located. The physical machine B 308 uses the remote descriptor 304 to perform an RDMA GET operation 314 in which the contents of the contiguous block 306 are transferred (316) from the physical machine A 302 to a contiguous block 310 at the physical machine B 308. Once the physical machine B 308 has deconstructed the remote descriptor 304, the physical machine B 308 can send a message back to the physical machine A 302, as illustrated and described below with respect to FIG. 3C.

Figure 3C:
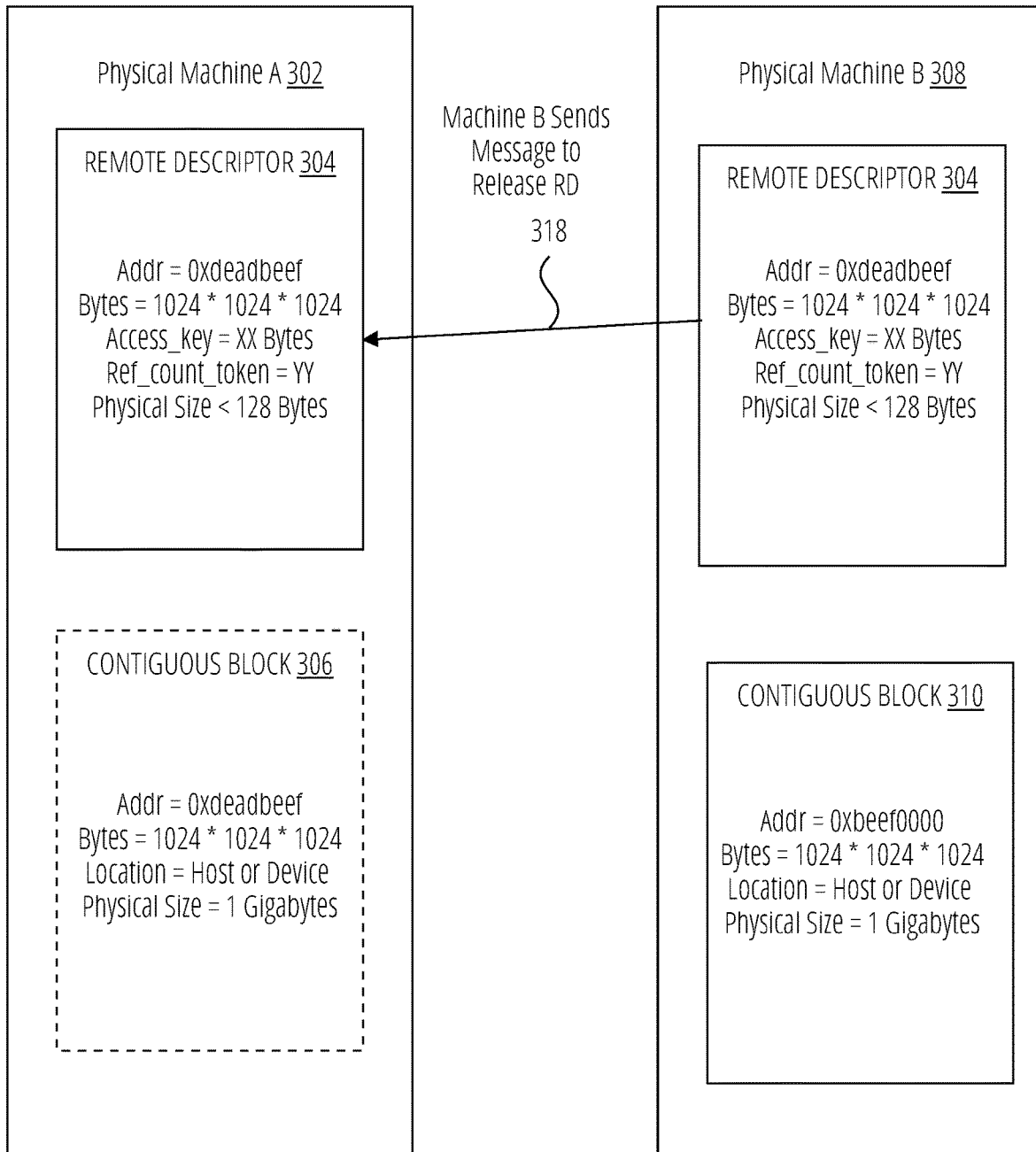
FIG. 3C illustrates the second physical machine sending a message to release the remote descriptor of FIG. 3A, according to at least one embodiment.

FIG. 3C illustrates the second physical machine sending a message to release the remote descriptor 304 of FIG. 3A, according to at least one embodiment. After the physical machine B 308 deconstructs the remote descriptor 304 and the contents of the contiguous block 306 are transferred to the contiguous block 310 on physical machine B 308, the physical machine B 308 can send a message 318 to physical machine A 302. Receiving the message 318 causes the physical machine A 302 to update a value (e.g., decrement) of the reference count token in the remote descriptor. Responsive to the value of the reference count token satisfying a threshold value (e.g., zero), the remote descriptor 304 can be released.

In one embodiment, the remote descriptor 304 is transferred to another physical machine B 308, as illustrated in FIG. 3A-FIG. 3C. In another embodiment, a remote descriptor can be split into a set of remote descriptors, as illustrated and described below with respect to FIG. 4.

Figure 4:
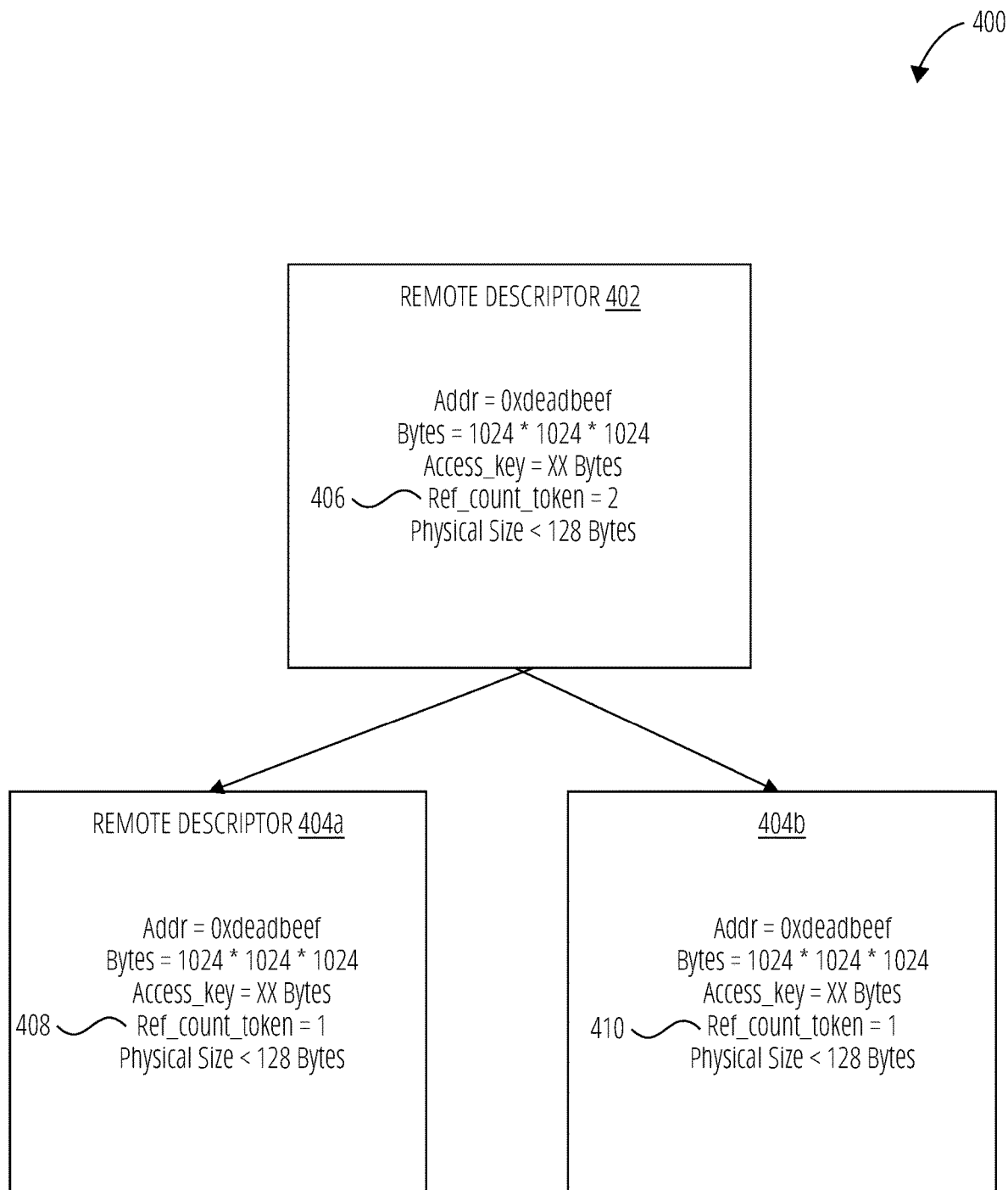
FIG. 4 illustrates splitting a remote descriptor into multiple descriptors in a data center, according to at least one embodiment.

FIG. 4 illustrates splitting a remote descriptor 402 into multiple remote descriptors 404a and 404b in a data center 400, according to at least one embodiment. In this embodiment, a computing device can receive or generate remote descriptor 402. The remote descriptor 402 describes or identifies a contiguous block in which a serialized object is stored. The remote descriptor 402 includes a starting address of the contiguous block, a size of the contiguous block (e.g., in bytes), a physical machine identifier corresponding to a location where the contiguous block 306 is located (e.g., a host identifier, a device identifier), an RDMA access key, and a reference count token 406. In this example, the reference count token 406 has a value of 2, allowing the remote descriptor 402 to be split into two remote descriptors 404a and 404b. If the remote descriptor 402 were to be split into ten remote descriptors, the value of the reference count token 406 would need to be at least ten. Splitting the remote descriptor 402 into multiple remote descriptors allows the individual remote descriptors 404a and 404b to be sent to different physical machines or different stages of the streaming pipeline. 4

As illustrated in FIG. 4, the remote descriptor 402 is split into two remote descriptors 404a and 404b. Remote descriptor 404a includes the same information that describes or identifies the contiguous block in which the serialized object is stored, except the remote descriptor 404a includes a reference count token 408 with a value of one. Remote descriptor 404b includes the same information that describes or identifies the contiguous block in which the serialized object is stored, except the remote descriptor 404b includes a reference count token 410 with a value of one. As illustrated in FIG. 4, the value of the reference count token 406 is split among the set of remote descriptors 404a and 404b. In another embodiment, the value of the reference count token 406 could be higher than two and be split among the remote descriptors 404a and 404b. For example, the value could be five and split so that the reference count token 408 has a value of three and the reference count token 410 has a value of two. The computing device can send each of the set of remote descriptors 404a and 404b to one or more computing devices in the data center 400 over a network fabric.

As illustrated in FIG. 4, the remote descriptor 402 (and remote descriptors 404a and 404b) can be smaller in size (i.e., fewer bytes) than the underlying serialized objects, making it easier to copy and move between nodes, segments, and machines. The remote descriptor 402 (and remote descriptor 404a and 404b) can allow the data to move only when requested and can be obtained (e.g., pulled) from the source. As illustrated with remote descriptors 404a and 404b, the remote descriptor 402 can be copied by dividing the reference count tokens. For example, if a remote descriptor has only two tokens (i.e., the value of the reference count token is two), it can only be duplicated once. The tokens can represent ownership shares, and at least one token is required for a remote descriptor.

Figure 5:
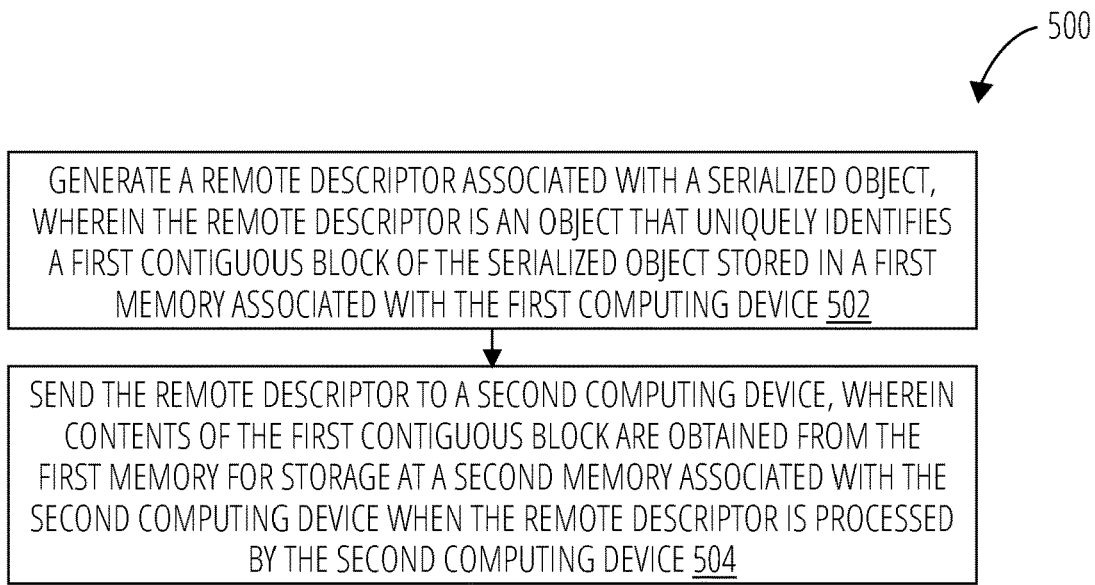
FIG. 5 is a flow diagram of a method of generating and sending a remote descriptor, according to at least one embodiment.

FIG. 5 is a flow diagram of a method 500 of generating and sending a remote descriptor, according to at least one embodiment. In at least one embodiment, method 500 may be performed by processing logic of a computing device, such as computing device 112, computing device 122, or the like. The processing logic can be a combination of hardware, firmware, software, or any combination thereof. Method 500 may be performed by one or more data processing units (e.g., DPUs, CPUs, and/or GPUs), including (or communicating with) one or more memory devices. In at least one embodiment, the first physical machine 112 of FIG. 1 performs method 500. In another embodiment, the physical machine B 110 of FIG. 1 performs the method 500. In at least one embodiment, the physical machine A 302 of FIG. 3 performs method 500. In another embodiment, the physical machine B of FIG. 3 performs the method 500. In at least one embodiment, method 500 may be performed by multiple processing threads, each thread executing one or more individual functions, routines, subroutines, or operations of the method. In at least one embodiment, processing threads implementing method 500 may be synchronized (e.g., using semaphores, critical sections, and/or other thread synchronization logic). Alternatively, processing threads implementing method 500 can be executed asynchronously with respect to each other. Various operations of method 500 may be performed differently than the order shown in FIG. 5. Some operations of the methods may be performed concurrently with other operations. In at least one embodiment, one or more operations shown in FIG. 5 may not always be performed.

In block 502, processing logic generates a remote descriptor associated with a serialized object. The remote descriptor is an object that uniquely identifies a first contiguous block of the serialized object stored in a first memory associated with the first computing device. In block 504, processing logic sends the remote descriptor to a second computing device. Contents of the first contiguous block are obtained from the first memory for storage at a second memory associated with the second computing device when the remote descriptor is processed by the second computing device.

Figure 6:
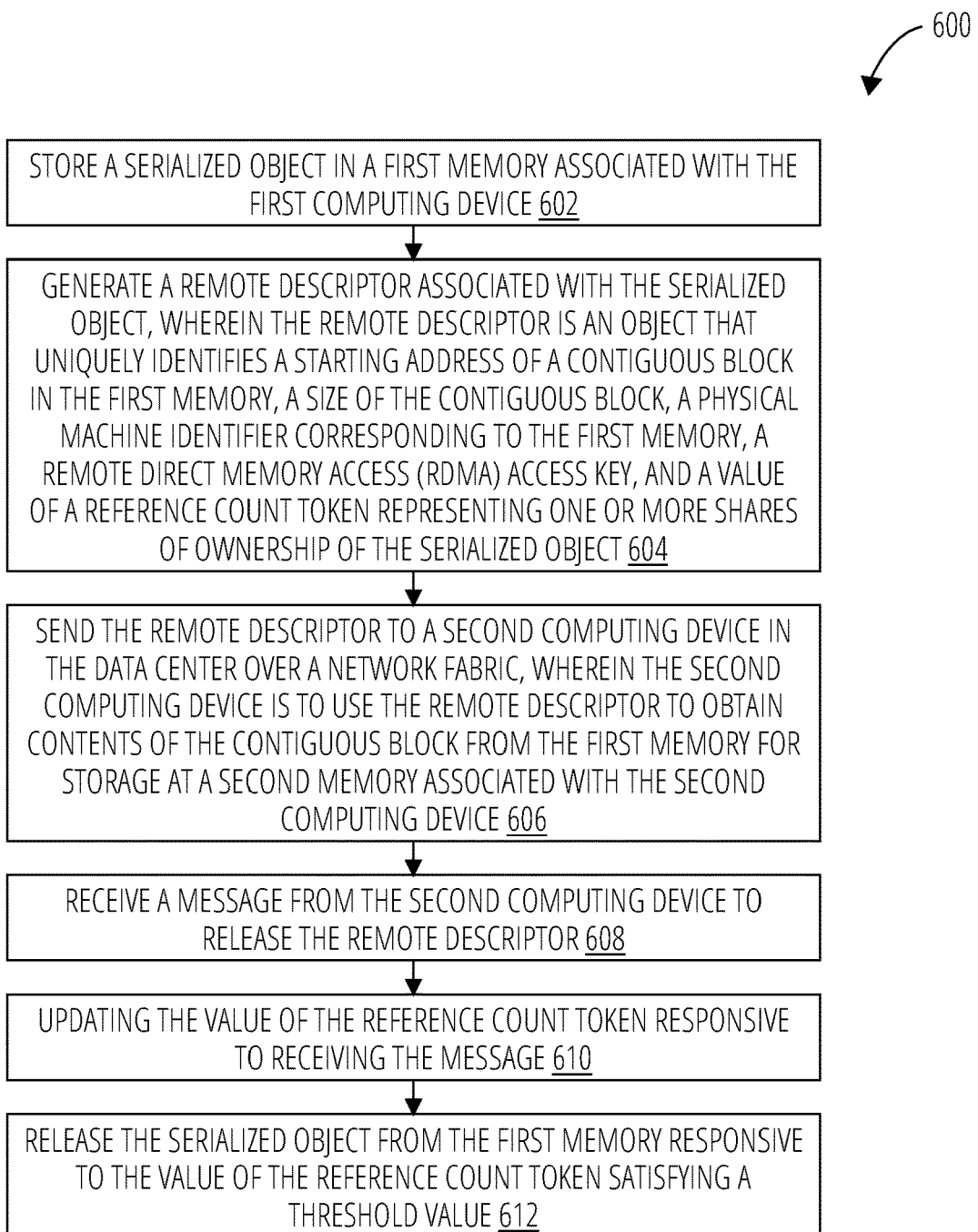
FIG. 6 is a flow diagram of a method of using a remote descriptor to transfer a serialized object between computing devices, according to at least one embodiment.

FIG. 6 is a flow diagram of a method 600 of using a remote descriptor to transfer a serialized object between computing devices, according to at least one embodiment. In at least one embodiment, method 600 may be performed by processing logic of a computing device, such as computing device 112, computing device 122, or the like. The processing logic can be a combination of hardware, firmware, software, or any combination thereof. Method 600 may be performed by one or more data processing units (e.g., DPUs, CPUs, and/or GPUs), including (or communicating with) one or more memory devices. In at least one embodiment, the first physical machine 112 of FIG. 1 performs method 600. In another embodiment, the physical machine B 110 of FIG. 1 performs the method 600. In at least one embodiment, the physical machine A 302 of FIG. 3 performs method 600. In another embodiment, the physical machine B of FIG. 3 performs the method 600. In at least one embodiment, method 600 may be performed by multiple processing threads, each thread executing one or more individual functions, routines, subroutines, or operations of the method. In at least one embodiment, processing threads implementing method 600 may be synchronized (e.g., using semaphores, critical sections, and/or other thread synchronization logic). Alternatively, processing threads implementing method 600 can be executed asynchronously with respect to each other. Various operations of method 600 may be performed differently than the order shown in FIG. 6. Some operations of the methods may be performed concurrently with other operations. In at least one embodiment, one or more operations shown in FIG. 6 may not always be performed.

In block 602, processing logic stores a serialized object in a first memory associated with the first computing device. In block 604, processing logic generates a remote descriptor associated with the serialized object. The remote descriptor is an object that uniquely identifies a starting address of a contiguous block in the first memory, a size of the contiguous block, a physical machine identifier corresponding to the first memory, an RDMA access key, and a value of a reference count token representing one or more shares of ownership of the serialized object. In block 606, processing logic sends the remote descriptor to a second computing device in the data center over a network fabric. Using the remote descriptor, the second computing device can obtain contents of the contiguous block from the first memory for storage at a second memory associated with the second computing device. In block 608, processing logic receives a message from the second computing device to release the remote descriptor. In block 610, processing logic updates the value of the reference count token responsive to receiving the message. In block 612, processing logic releases the serialized object from the first memory responsive to the value of the reference count token satisfying a threshold value.

In a further embodiment, a size of the remote descriptor is less than the size of the contiguous block. In a further embodiment, the processing logic can receive a second remote descriptor associated with a second serialized object over the network fabric. The second remote descriptor is a second object that uniquely identifies a second starting address of a second contiguous block in a third memory associated with a third computing device in the data center, a second size of the second contiguous block, a second physical machine identifier corresponding to the third memory, a second RDMA access key, and a value of a second reference count token representing one or more shares of ownership of the second serialized object. Using the second remote descriptor, the processing logic performs an RDMA GET operation to obtain the contents of the second contiguous block from the third memory for transfer to the first memory over the network fabric.

In a further embodiment, the processing logic can receive the second remote descriptor from a fourth computing device over the network fabric. In another embodiment, the processing logic can receive the second remote descriptor from another computing device in the data center.

In a further embodiment, the processing logic can send a second message to the third computing device over the network fabric to release the second remote descriptor. The value of the second reference count token is updated in response to the second message. The second serialized object is released responsive to the value of the second reference count token satisfying a threshold value.

In a further embodiment, the processing logic can receive a second remote descriptor associated with a second serialized object over the network fabric. The second remote descriptor is a second object that uniquely identifies a second starting address of a second contiguous block in a third memory associated with a third computing device in the data center, a second size of the second contiguous block, a second physical machine identifier corresponding to the third memory, a second RDMA access key, and a value of a second reference count token representing one or more shares of ownership of the second serialized object. The processing logic sends the second remote descriptor to the second computing device or a fourth computing device over the network fabric. Sending the second remote descriptor to the second or fourth computing device transfers full ownership of the second serialized object to the second or fourth computing device.

In a further embodiment, the processing logic can receive a second remote descriptor associated with a second serialized object over the network fabric. The second remote descriptor is a second object that uniquely identifies a second starting address of a second contiguous block in a third memory associated with a third computing device, a second size of the second contiguous block, a second physical machine identifier corresponding to the third memory, a second RDMA access key, and a value of a second reference count token representing one or more shares of ownership of the second serialized object. The processing logic generates a set of remote descriptors from the second remote descriptor. A value of the second reference count token is split among the set of remote descriptors. The processing logic can send each of the set of remote descriptors to one of a set of computing devices in the data center over the network fabric. The set of computing devices can include the second computing device described above.

Streaming Batcher

The following section describes embodiments related to generating, sending, and processing streaming batches with multiple remote descriptors for enabling RDMA transport of a serialized object in streaming pipelines implemented with multiple computing devices in a data center. As described above, conventional batchers are external to the data plane and require the full data payload to be collected and forwarded, resulting in at least a doubling of the data movement across machine boundaries. Aspects and embodiments of the present disclosure address the above and other deficiencies by providing a streaming batch of multiple remote descriptors that allow at least some contents of a serialized object to be obtained from a first memory for storage at a second memory before the streaming batch is completed as described below with respect to FIG. 7A-FIG. 7B.

Figure 7A:
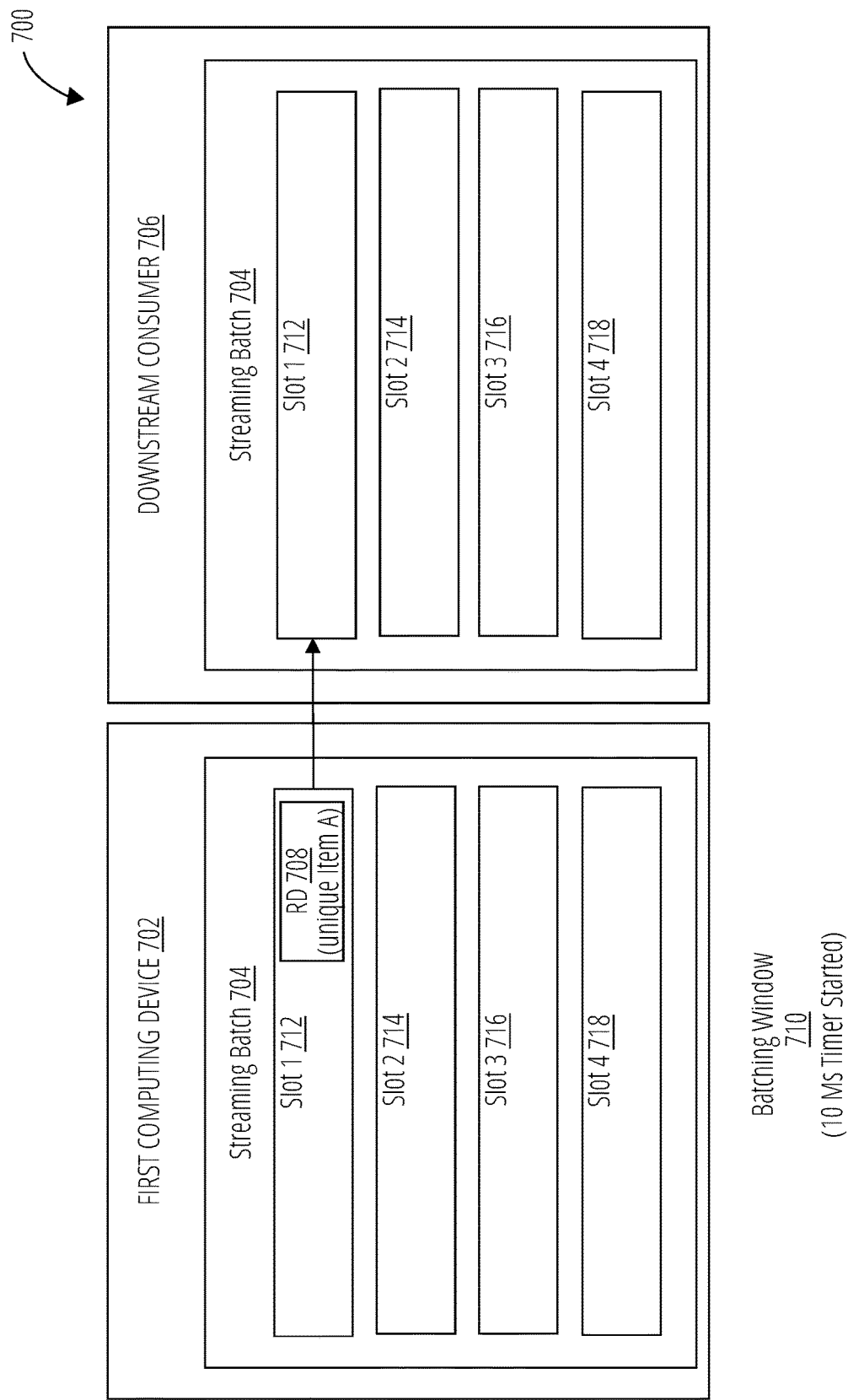
FIG. 7A is a block diagram of a first computing device in a data center for generating a streaming batch at a first instance, according to at least one embodiment.

FIG. 7A is a block diagram of a first computing device 702 in a data center 700 for generating a streaming batch 704 at a first instance, according to at least one embodiment. The data center 700 includes a first computing device 702 with a streaming batcher. Streaming batcher refers to processing logic that can be a combination of hardware, firmware, software, or any combination thereof that can generate, manage, and send a streaming batch with one or more remote descriptors, where each remote descriptor uniquely identifies a location of a serialized object in a data center. The streaming batcher collects individual objects into a collection called a streaming batch 704 by count and/or by time. The streaming batch 704 can include a fixed number of slots (e.g., N slots for individual batch items) and a batching window 710 (also referred to as a timing window), where a timer starts at a first instance on an assignment or acceptance of a first batch item. Slots are assigned batch items, and each slot corresponds to one batch item. As illustrated in an example, the streaming batch 704 includes four slots, including a slot 1 712, a slot 2 714, a slot 3 716, and a slot 4 718. The streaming batcher can collect work packets as remote descriptors (also called batch items or streaming batch items). The streaming batcher can assign a remote descriptor (RD) 708 (Unique Item A) to slot 1 712 as a first instance to start the timer of the batching window 710. A stream is initiated or opened to the downstream consumer 706 that can operate on the streaming batch 704 on the arrival of the first batch item, RD 708, and each batch item (remote descriptor) is streamed to the downstream consumers 706 as it comes in. That is, upon assigning the RD 708 to slot 1 712, the streaming batcher can immediately forward the RD 708 to a downstream consumer 706 (also referred to as a downstream target) before a batching window 710 is completed. The streaming batcher is completed the streaming batch 704 when either all slots are filled or the batching window 710 ends (i.e., the timer of the batching window 710 expires), whichever happens first. Completing the streaming batch 704 also ends or closes the stream.

As illustrated in FIG. 7A, the first computing device 702 generates the streaming batch 704, assigns the RD 708 at the first instance to start the batching window 710, and immediately sends the RD 708 to the downstream consumer 706. The operations of the downstream consumer 706 are described below with respect to FIG. 7B.

Figure 7B:
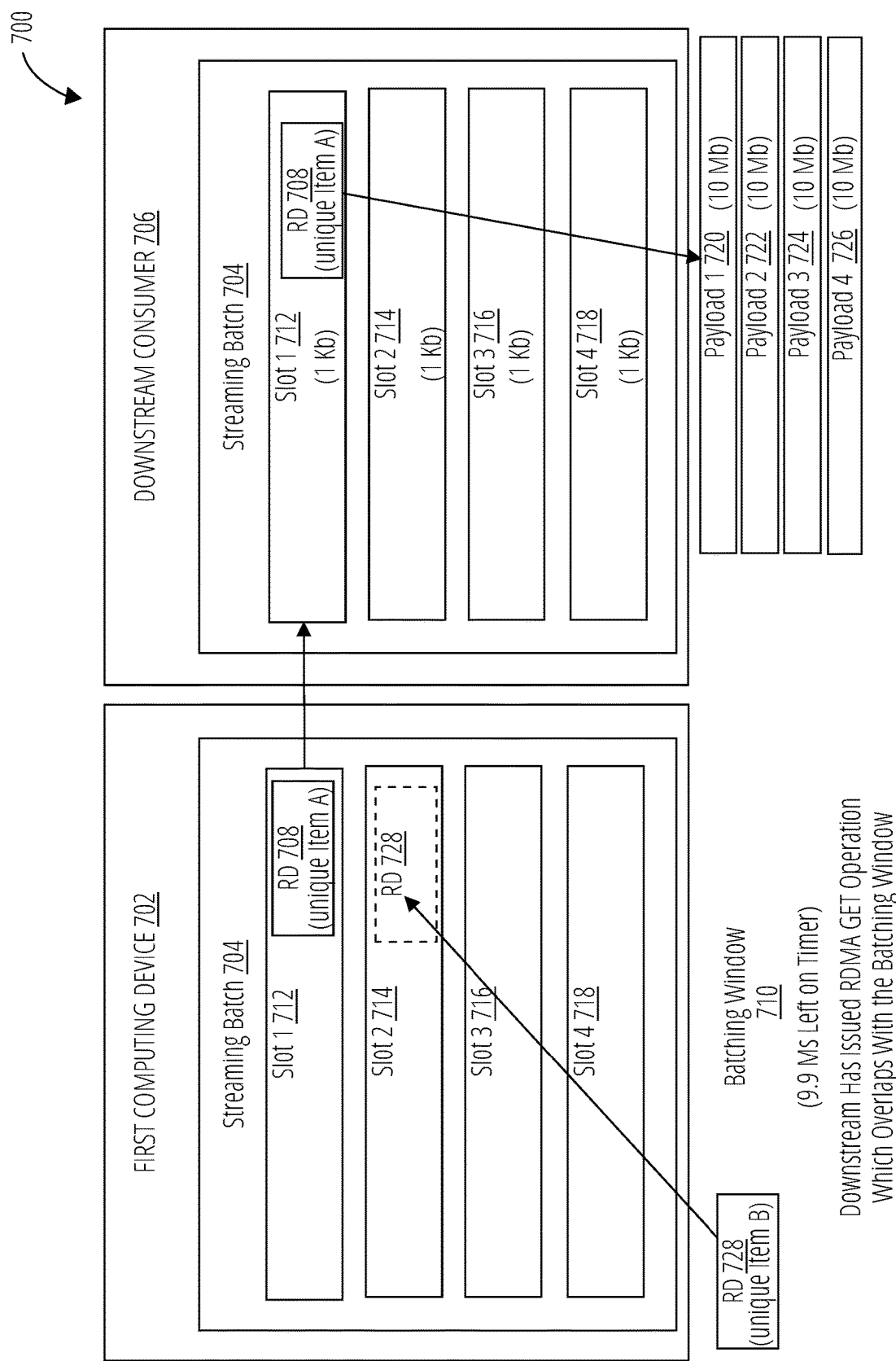
FIG. 7B is a block diagram of a downstream consumer in a data center for processing the RD (Unique Item A) at a second instance while the batching window is still open, according to at least one embodiment.

FIG. 7B is a block diagram of a downstream consumer 706 in a data center 700 for processing the RD 708 at a second instance while the batching window 710 is still open, according to at least one embodiment. The downstream consumers 706 can be one or more computing devices in the data center 700. As described above, the first computing device 702 can forward the remote descriptors in the streaming batch 704, which have smaller payloads than the underlying objects (e.g., 1 kilobyte (kb) cf. 10 megabytes (mb)), and the downstream consumers 706 can begin some operations with respect to individual batch items of the streaming batch 704 before the streaming batch 704 is completed. The downstream consumer 706 can receive the individual remote descriptors as they come through the batch stream. The RD 708 can reduce the need for large amounts of data (serialized object) to be moved to the downstream consumer 706 while batching multiple serialized objects in the batching window 710. By forwarding the incoming work packets (batch items) to the intended downstream consumer 706 immediately upon arrival, the downstream consumer 706 can instantiate an operation (e.g., a PULL operation, an RDMA GET operation, or the like) to retrieve the remote data (serialized object) identified in the RD 708 while the batching window 710 is still open (i.e., before the streaming batch 704 is completed). The downstream consumer 706 can issue one or more RDMA GET operations on the payload to obtain the remote data (local on the originating device) on the reception of the remote descriptor. This allows an overlap in the batching window 710 and RDMA communications. In at least one embodiment, the downstream consumer 706 can instantiate a first RDMA GET operation to obtain payload 1 720 of a serialized object described by the RD 708, a second RDMA GET operation to obtain payload 2 722 of a serialized object described by the RD 708, a third RDMA GET operation to obtain payload 3 724 of a serialized object described by the RD 708, and a fourth RDMA GET operation to obtain payload 4 726 of a serialized object described by the RD 708. The RDMA GET operations can overlap with the batching window 710 (e.g., 9.9 ms left in the timer).

By batching remote descriptors as batch items of the streaming batch 704, the streaming batcher helps reduce the cost of duplicate large data transfers by logically batching the remote descriptors rather than the actual data (serialized objects) described in the remote descriptors in the streaming batch 704. The streaming batcher can reduce the data movement by orders of magnitudes by batching and transferring the remote descriptors rather than the serialized objects. The streaming batcher can decrease the overall latency by applying an overlap in obtaining the remote data with the windowing of the streaming batcher.

In at least one embodiment, the streaming batcher can assign a second RD 728 (Unique Item B) to slot 2 714 of the streaming batch 704 during the batching window 710 (e.g., 9.9 ms left on timer). Once the second RD 728 is assigned, the streaming batcher sends the RD 720 to the downstream consumers 706. As described above, the streaming batcher can continue to assign RDs to the remaining slots of the streaming batch 704 until all the slots are filled or the timer of the streaming batch 704 expires.

Figure 8:
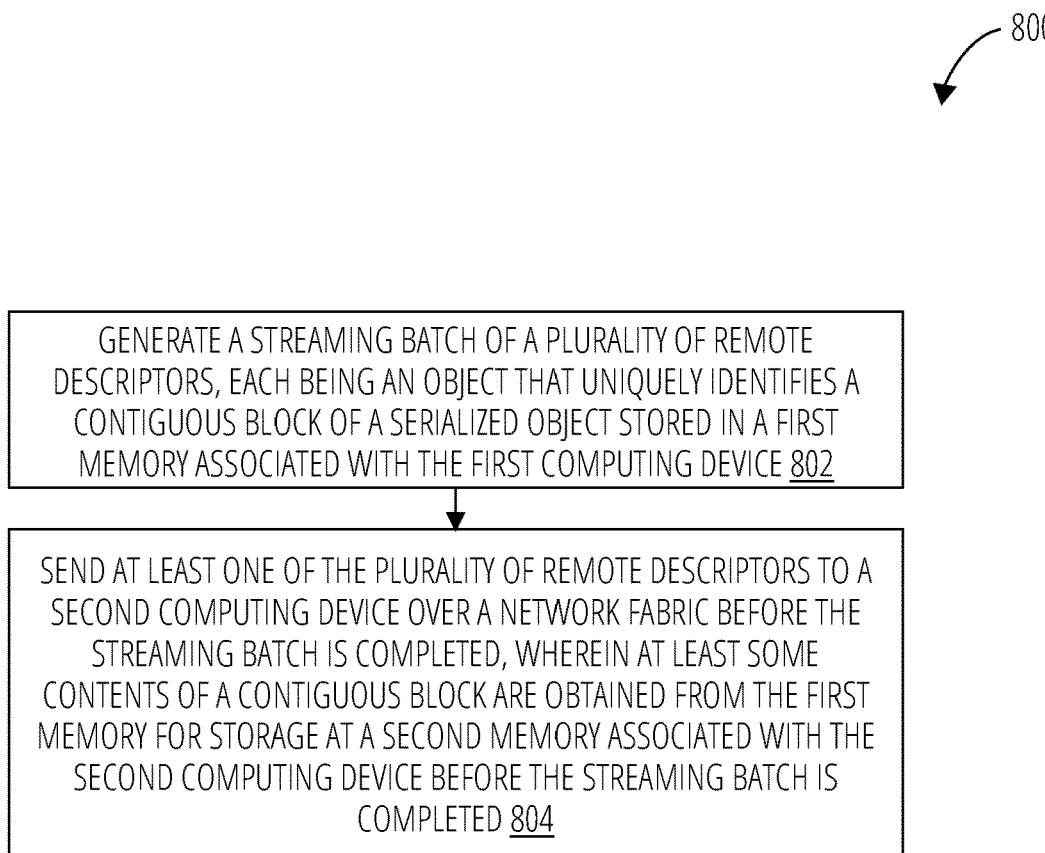
FIG. 8 is a flow diagram of a method of generating a streaming batch, according to at least one embodiment.

FIG. 8 is a flow diagram of a method 800 of generating a streaming batch, according to at least one embodiment. In at least one embodiment, method 800 may be performed by processing logic of a computing device, such as computing device 112, computing device 122, or the like. The processing logic can be a combination of hardware, firmware, software, or any combination thereof. Method 800 may be performed by one or more data processing units (e.g., DPUs, CPUs, and/or GPUs), including (or communicating with) one or more memory devices. In at least one embodiment, the first physical machine 112 of FIG. 1 performs method 800. In another embodiment, the physical machine B 110 of FIG. 1 performs the method 800. In at least one embodiment, the physical machine A 302 of FIG. 3 performs method 600. In another embodiment, the physical machine B of FIG. 3 performs the method 900. In at least one embodiment, method 800 may be performed by multiple processing threads, each thread executing one or more individual functions, routines, subroutines, or operations of the method. In at least one embodiment, processing threads implementing method 800 may be synchronized (e.g., using semaphores, critical sections, and/or other thread synchronization logic). Alternatively, processing threads implementing method 800 can be executed asynchronously with respect to each other. Various operations of method 800 may be performed differently than the order shown in FIG. 8. Some operations of the methods may be performed concurrently with other operations. In at least one embodiment, one or more operations, shown in FIG. 8, may not always be performed.

In block 802, the processing logic generates a streaming batch of a set of remote descriptors, each being an object that uniquely identifies a contiguous block of a serialized object stored in a first memory associated with the first computing device. In block 804, the processing logic sends at least one of the set of remote descriptors to a second computing device, such as over a network fabric, before the streaming batch is completed. At least some contents of a contiguous block are obtained from the first memory for storage at a second memory associated with the second computing device before the streaming batch is completed.

Figure 9:
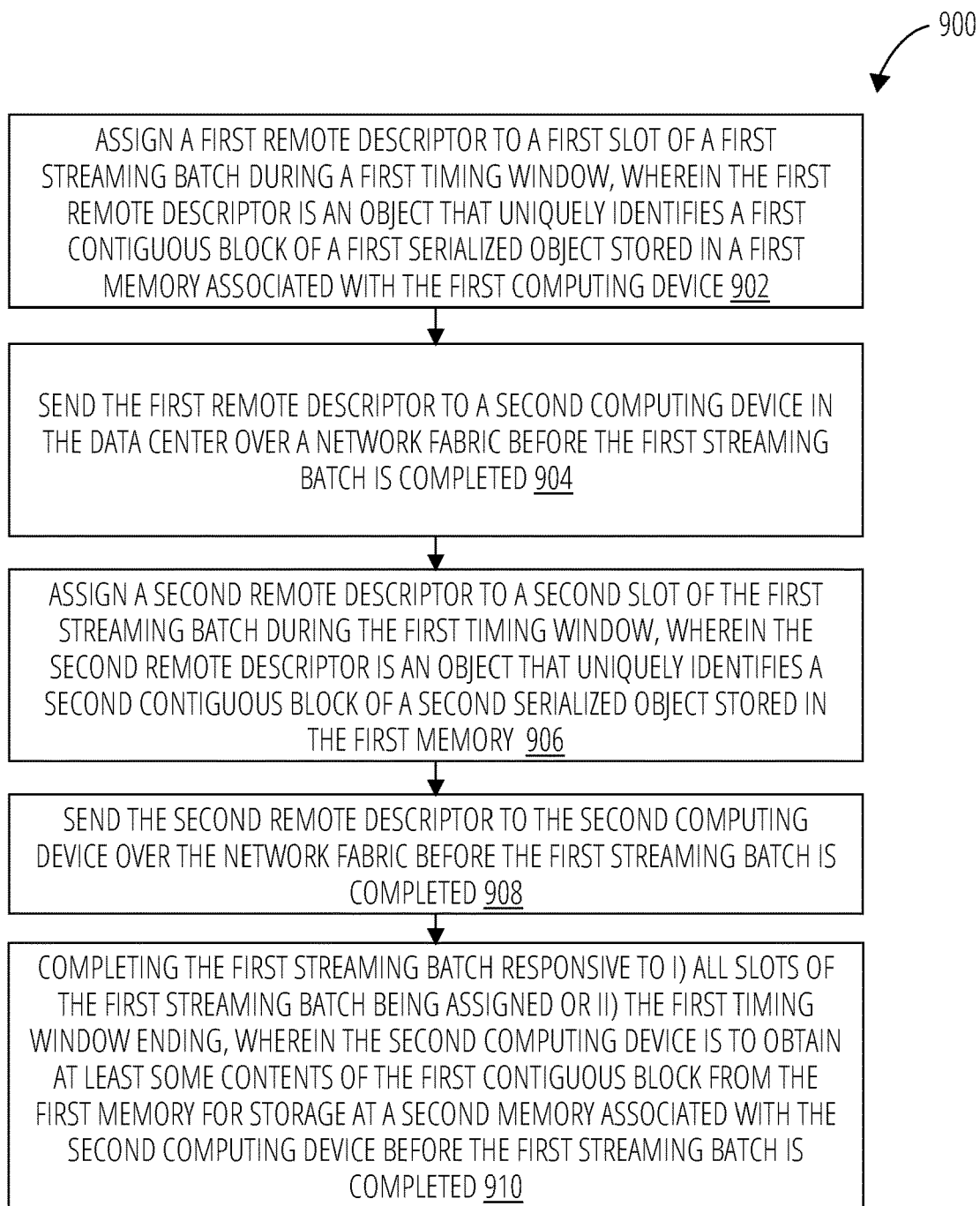
FIG. 9 is a flow diagram of a method of using a streaming batch to transfer multiple streaming objects, according to at least one embodiment.

FIG. 9 is a flow diagram of a method 900 of using a streaming batch to transfer multiple streaming objects, according to at least one embodiment. In at least one embodiment, method 900 may be performed by processing logic of a computing device, such as computing device 112, computing device 122, or the like. The processing logic can be a combination of hardware, firmware, software, or any combination thereof. Method 900 may be performed by one or more data processing units (e.g., DPUs, CPUs, and/or GPUs), including (or communicating with) one or more memory devices. In at least one embodiment, the first physical machine 112 of FIG. 1 performs method 900. In another embodiment, the physical machine B 110 of FIG. 1 performs the method 900. In at least one embodiment, the physical machine A 302 of FIG. 3 performs method 900. In another embodiment, the physical machine B of FIG. 3 performs the method 900. In at least one embodiment, method 900 may be performed by multiple processing threads, each thread executing one or more individual functions, routines, subroutines, or operations of the method. In at least one embodiment, processing threads implementing method 900 may be synchronized (e.g., using semaphores, critical sections, and/or other thread synchronization logic). Alternatively, processing threads implementing method 900 can be executed asynchronously with respect to each other. Various operations of method 900 may be performed differently than the order shown in FIG. 10. Some operations of the methods may be performed concurrently with other operations. In at least one embodiment, one or more operations shown in FIG. 10 may not always be performed.

In block 902, processing logic assigns a first remote descriptor to a first slot of a first streaming batch during a first timing window. The first remote descriptor is an object that uniquely identifies a first contiguous block of a first serialized object stored in a first memory associated with the first computing device. In block 904, processing logic sends the first remote descriptor to a second computing device in the data center over a network fabric before the first streaming batch is completed. Sending the first remote descriptor opens a stream between the first memory and the second computing device. In block 906, processing logic assigns a second remote descriptor to a second slot of the first streaming batch during the first timing window. The second remote descriptor is an object that uniquely identifies a second contiguous block of a second serialized object stored in the first memory. In block 908, processing logic sends the second remote descriptor to the second computing device over the network fabric before the first streaming batch is completed. In block 910, processing logic completes the first streaming batch responsive to i) all slots of the first streaming batch being assigned or ii) the first timing window ends. The second computing device obtains at least some contents of the first contiguous block from the first memory for storage at a second memory associated with the second computing device before the first streaming batch is completed.

In a further embodiment, the first remote descriptor includes a starting address of the first contiguous block, a size of the first contiguous block, a physical machine identifier corresponding to the first memory, an RDMA access key, and a value of a reference count token representing one or more shares of ownership of the first serialized object. A size of the first remote descriptor is less than the size of the first contiguous block.

In a further embodiment, the processing logic can also receive a first message from the second computing device to release the first remote descriptor. The processing logic updates the value of the reference count token responsive to receiving the message. The processing logic can release the first serialized object from the first memory responsive to the value of the reference count token satisfying a threshold value.

In a further embodiment, the processing logic can initialize the first streaming batch to include a specified number of slots, each slot corresponding to an individual streaming batch item. The first timing window starts in response to a first streaming batch item being assigned to the first streaming batch. The obtained contents of the first contiguous block are processed by the second computing device once the first streaming batch is completed.

In a further embodiment, the processing logic can also receive a third remote descriptor associated with a second streaming batch during a second timing window. The third remote descriptor is a second object that uniquely identifies a second contiguous block of a second serialized object stored in a third memory associated with a third computing device in the data center. Using the third remote descriptor, the processing logic performs an RDMA GET operation to obtain at least some contents of the second contiguous block from the third memory for transfer to the first memory over the network fabric.

In a further embodiment, the processing logic can receive the second remote descriptor from a fourth computing device over the network fabric.

The processing logic can also send a second message to the third computing device over the network fabric to release the second remote descriptor. The second remote descriptor includes a starting address of the second contiguous block, a size of the second contiguous block, a physical machine identifier corresponding to the third memory, an RDMA access key, and a value of a reference count token representing one or more shares of ownership of the second serialized object. A size of the second remote descriptor is less than the size of the second contiguous block. The value of the reference count token is updated in response to the second message. The second serialized object is released responsive to the value of the reference count token satisfying a threshold value.

Remote Promise-Future Objects

The following section describes embodiments related to generating, sending, and processing of remote promise objects and remote promise-future objects for enabling, in streaming pipelines implemented with multiple computing devices in a data center, downstream nodes to obtain data from upstream storage and downstream nodes to send data (e.g., PUSH/PUT operation) to upstream nodes while those upstream nodes yield their execution context and consume no resources until the downstream PUSH/PUT operation is completed.

Stateful streaming pipelines can be challenging when downstream consumers need to update their upstream state. Without the concept of the remote promise objects and remote promise-future objects, these stateful algorithms need to be refactored to be stateless or incur a serialization bottleneck that can impact performance.

Aspects and embodiments of the present disclosure address the above and other deficiencies by providing a remote promise object or a remote promise-future object to enable downstream nodes to obtain data from upstream storage and downstream nodes to send data (e.g., PUSH/PUT operation) to upstream nodes while those upstream nodes yield their execution context and consume no resources until the downstream PUSH operation is completed. A remote promise object is an object that uniquely identifies a contiguous block in memory where a serialized object is stored. The remote promise object identifies a starting address of a contiguous block in local memory, a size of the contiguous block, a physical machine identifier corresponding to the local memory, an RDMA access key, and a value of a reference count token representing a unique ownership of the serialized object since the remote promise object is unique. The remote promise object is a language construct or a control structure that can be exchanged with another computing device that can complete the remote promise object providing a message back to the device sending the remote promise object. A remote promise-future object is an object that uniquely identifies a contiguous block in memory where a first serialized object is stored and specifies how the remote promise-future object is completed. The remote promise-future object can be assigned to a first serialized object stored in a first physical machine in a data center and can specify that the remote promise-future object is completed when a second physical machine in the data center provides a second serialized object back to the first physical machine. The remote promise-future object is a language construct or a control structure that can be exchanged with another computing device that can complete the remote promise-future object by providing an object back to the device sending the remote promise-future object. The remote promise object and remote promise-future object can provide language-level constructs similar to std::promise and std::future, which enable the upstream PUSH/PUT data and the indication that an upstream node can continue to progress. The remote promise object and remote promise-future object are language constructs that are the conceptual counterparts to the remote descriptor. The remote descriptors can enable a downstream node to obtain data from upstream storage, and the remote promise object and remote promise-future object constructs enable downstream nodes to send data (e.g., PUSH/PUT operation) data to upstream nodes while those upstream nodes yield their execution context and consume no resources until the downstream PUSH/PUT operation is complete.

Figure 10:
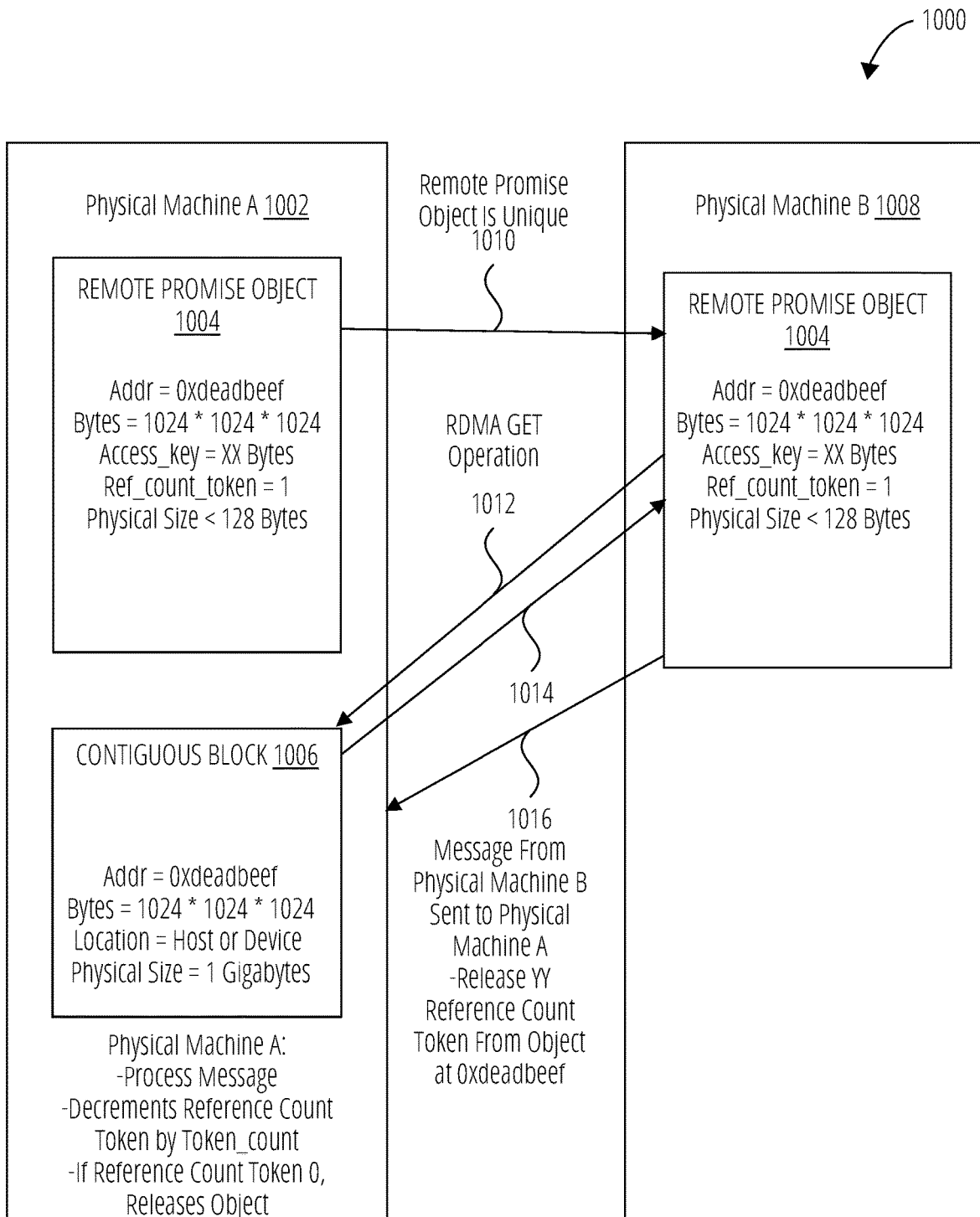
FIG. 10 illustrates a remote promise object generated by a first physical machine and sent to a second physical machine in a data center, according to at least one embodiment.

FIG. 10 illustrates a remote promise object 1004 generated by a first physical machine and sent to a second physical machine in a data center 1000, according to at least one embodiment. The data center 1000 includes a physical machine A 1002 and a physical machine B 1008. The physical machine A 1002 generates the remote promise object 1004 that uniquely identifies a serialized object stored at contiguous block 1006. The remote promise object 1004 describes or identifies the contiguous block 1006 in which a serialized object is stored. The remote promise object 1004 includes a starting address of the contiguous block 1006, a size of the contiguous block 1006 (e.g., in bytes), a physical machine identifier corresponding to the physical machine A 1002 in which the contiguous block 1006 is located (e.g., a host identifier, a device identifier), an RDMA access key, and a reference count token. The contiguous block 1006 includes a starting address that is the same value as the starting address described in the remote promise object 1004, a size of the contiguous block 1006 that is the same value as the size described in the remote promise object 1004, and a physical machine identifier that is the same value as the physical machine identifier described in the remote promise object 1004. The remote promise object 1004 has a size that is less than a size of the serialized object.

As illustrated in FIG. 10, the physical machine A 1002 sends the remote promise object 1004 to the physical machine B 1008 (operation 1010) instead of the contiguous block 1006. The physical machine B 1008 can process the remote promise object 1004 on demand, as illustrated and described below.

After the physical machine B 1008 receives the remote promise object 1004, the physical machine B 1008 can deconstruct the remote promise object 1004 to identify where the serialized object is located. The physical machine B 1008 uses the remote promise object 1004 to perform an RDMA GET operation 1012 in which the contents of the contiguous block 1006 are transferred (operation 1014) from the physical machine A 1002 to a contiguous block at the physical machine B 1008. Once the physical machine B 1008 has deconstructed the remote promise object 1004, the physical machine B 1008 can send a message 1016 back to the physical machine A 1002. Receiving the message 1016 causes the physical machine A 1002 to update a value (e.g., decrement) of the reference count token in the remote promise object 1004. Responsive to the value of the reference count token satisfying a threshold value (e.g., zero), the remote promise object 1004 can be released. In this example, the remote promise object 1004 is unique, so the value of the reference count token of the remote promise object 1004 can be set to one initially and decremented to zero upon receiving the message 1016, releasing the remote promise object 1004.

Figure 11:
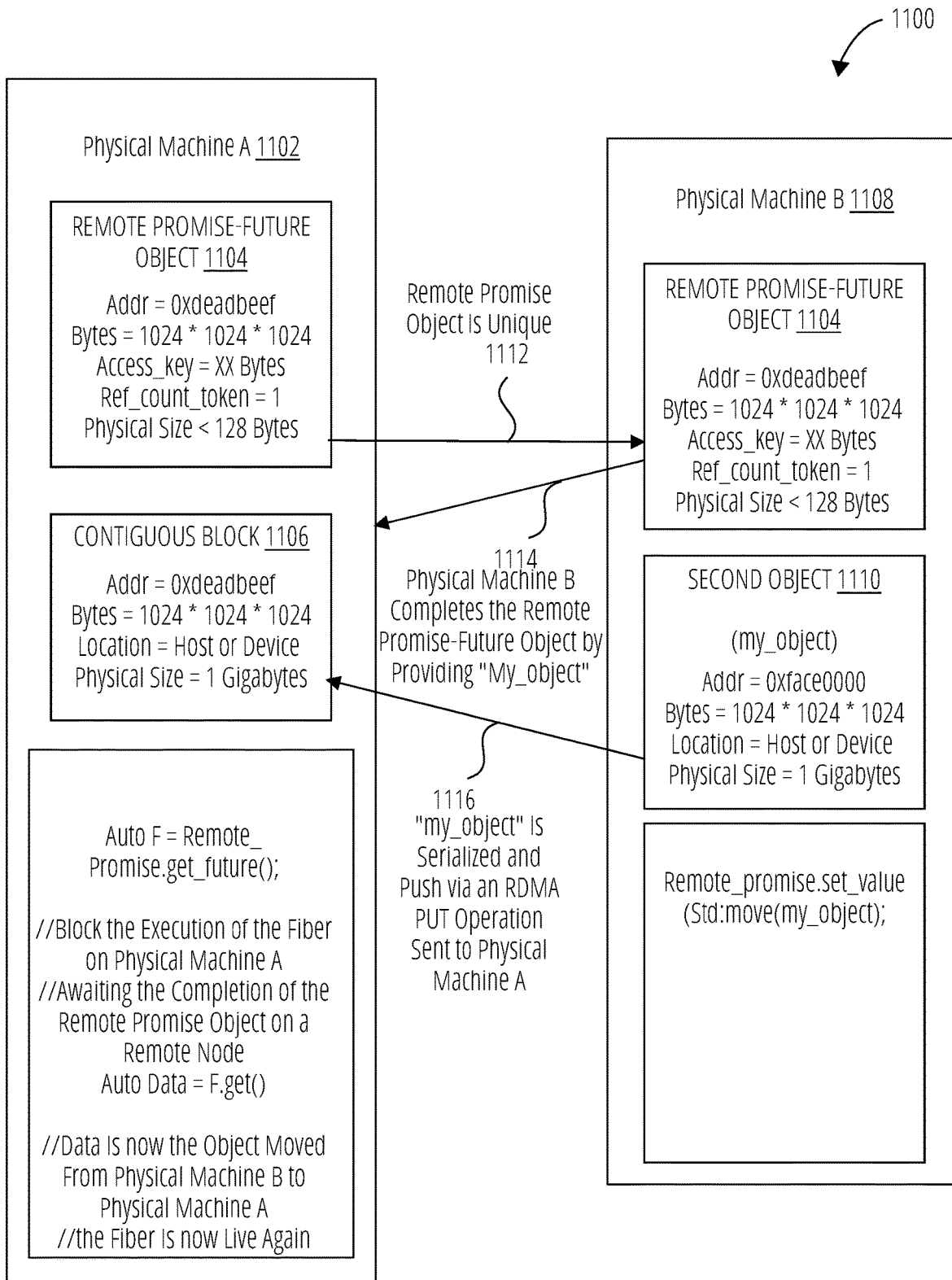
FIG. 11 illustrates a remote promise-future object generated by a first physical machine and sent to a second physical machine in a data center, according to at least one embodiment.

FIG. 11 illustrates a remote promise-future object generated by a first physical machine and sent to a second physical machine in a data center 1100, according to at least one embodiment. The data center 1100 includes a physical machine A 1102 and a physical machine B 110. The physical machine A 1102 generates the remote promise-future object 1104 that uniquely identifies a first serialized object stored at contiguous block 1106. The remote promise object 1004 describes or identifies the contiguous block 1006 in which the first serialized object is stored and specifies that the remote promise-future object 1104 is completed when a second object 1110 is provided back to physical machine A 1102. The remote promise-future object 1104 includes a starting address of the contiguous block 1106, a size of the contiguous block 1106 (e.g., in bytes), a physical machine identifier corresponding to the physical machine A 1102 in which the contiguous block 1106 is located (e.g., a host identifier, a device identifier), an RDMA access key, and a reference count token. The contiguous block 1106 includes a starting address that is the same value as the starting address described in the remote promise-future object 1104, a size of the contiguous block 1106 that is the same value as the size described in the remote promise-future object 1104, and a physical machine identifier that is the same value as the physical machine identifier described in the remote promise-future object 1104. The remote promise-future object 1104 has a size that is less than a size of the first serialized object.

As illustrated in FIG. 11, the physical machine A 1102 sends the remote promise-future object 1104 to the physical machine B 110 (operation 1112) instead of the contiguous block 1106. The physical machine B 110 can process the remote promise-future object 1104 on demand, as illustrated and described below.

After the physical machine B 110 receives the remote promise-future object 1104, the physical machine B 110 can deconstruct the remote promise-future object 1104 to identify where the first serialized object is located. The physical machine B 110 uses the remote promise-future object 1104 to perform an RDMA GET operation 1114 in which the contents of the contiguous block 1106 are transferred from the physical machine A 1102 to a contiguous block at the physical machine B 110. The contiguous block can be the same location where the second object 1110 is stored. The physical machine B 110 processes the first serialized object and generates the second object 1110. The physical machine B 110 can serialize the second object 1110 and send the second object 1110 to physical machine A 1102. In at least one embodiment, the physical machine B 110 sends the second object 1110 by performing an RDMA PUT operation 1116 to push the second object 1110 (e.g., serialized object) to complete the remote promise-future object 1104. That is, the physical machine B 110 completes the remote promise-future object 1104 by providing the second object 1110 back to the physical machine A 1102. In a further embodiment, the physical machine B 110 can send a message back to the physical machine A 1102 (not illustrated in FIG. 11). Receiving the message causes the physical machine A 1102 to update a value (e.g., decrement) of the reference count token in the remote promise-future object 1104. Responsive to the value of the reference count token satisfying a threshold value (e.g., zero), the remote promise-future object 1104 can be released. In this example, the remote promise-future object 1104 is unique, so the value of the reference count token of the remote promise-future object 1104 can be set to one initially and decremented to zero upon receiving the message, releasing the remote promise-future object 1104.

As illustrated in FIG. 11, physical machine A 1102 can use the following exemplary code:

```
auto f = remote_promise.get_future( );
// block the execution of the network fabric on physical machine A
// awaiting the completion of the remote promise-future object on a remote node
auto data = f.get( );
// data is now the object moved from physical machine B to physical machine A
// the network fabric is now live again
```

As illustrated in FIG. 11, physical machine B 110 can use the following exemplary code:

remote_promise.set_value (std::move(my_object))

Figure 12:
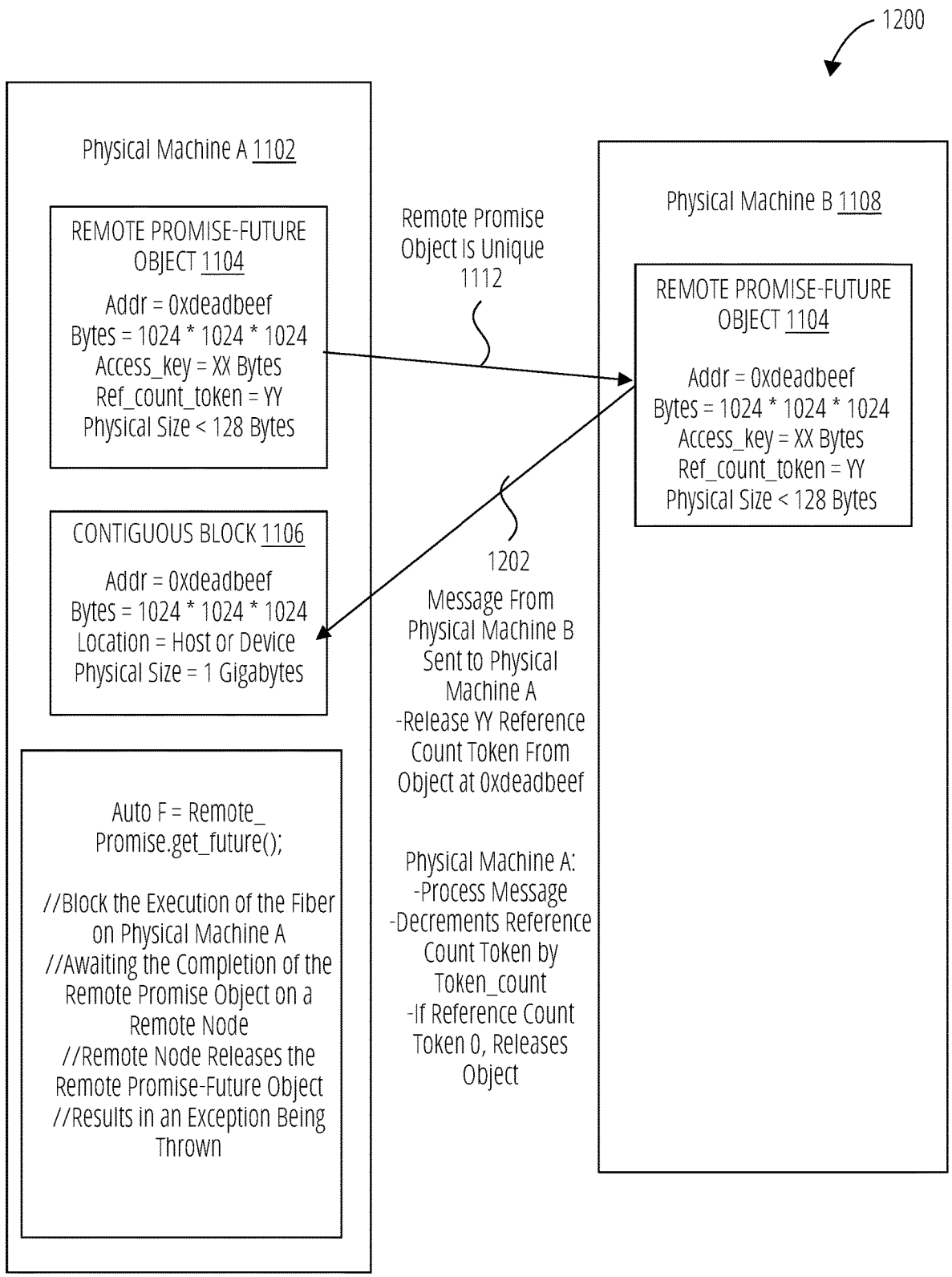
FIG. 12 illustrates a remote promise-future object generated by a first physical machine and sent to a second physical machine in a data center, according to at least one embodiment.

FIG. 12 illustrates a remote promise-future object 1104 generated by a first physical machine and sent to a second physical machine in the data center 1200, according to at least one embodiment. The data center 1200 of FIG. 12 is similar to the data center 1100 of FIG. 11, except the physical machine B 1108 does not return a result to complete the remote promise-future object 1104. Rather, the physical machine B 1108 returns a message 1202 to complete the remote promise-future object 1104 by releasing the remote promise-future object 1104. Receiving the message 1202 causes the physical machine A 1102 to update a value (e.g., decrement) of the reference count token in the remote promise-future object 1104. Responsive to the value of the reference count token satisfying a threshold value (e.g., zero), the remote promise-future object 1104 can be released and results in an exception being thrown.

As illustrated in FIG. 12, physical machine A 1102 can use the following exemplary code:

```
auto f = remote_promise.get_future( );
// block the execution of the network fabric on physical machine A
// awaiting the completion of the remote promise-future object on a remote node
auto data = f.get( );
// data is now the object moved from physical machine B to physical machine A
// the network fabric is now live again
```

Figure 13:
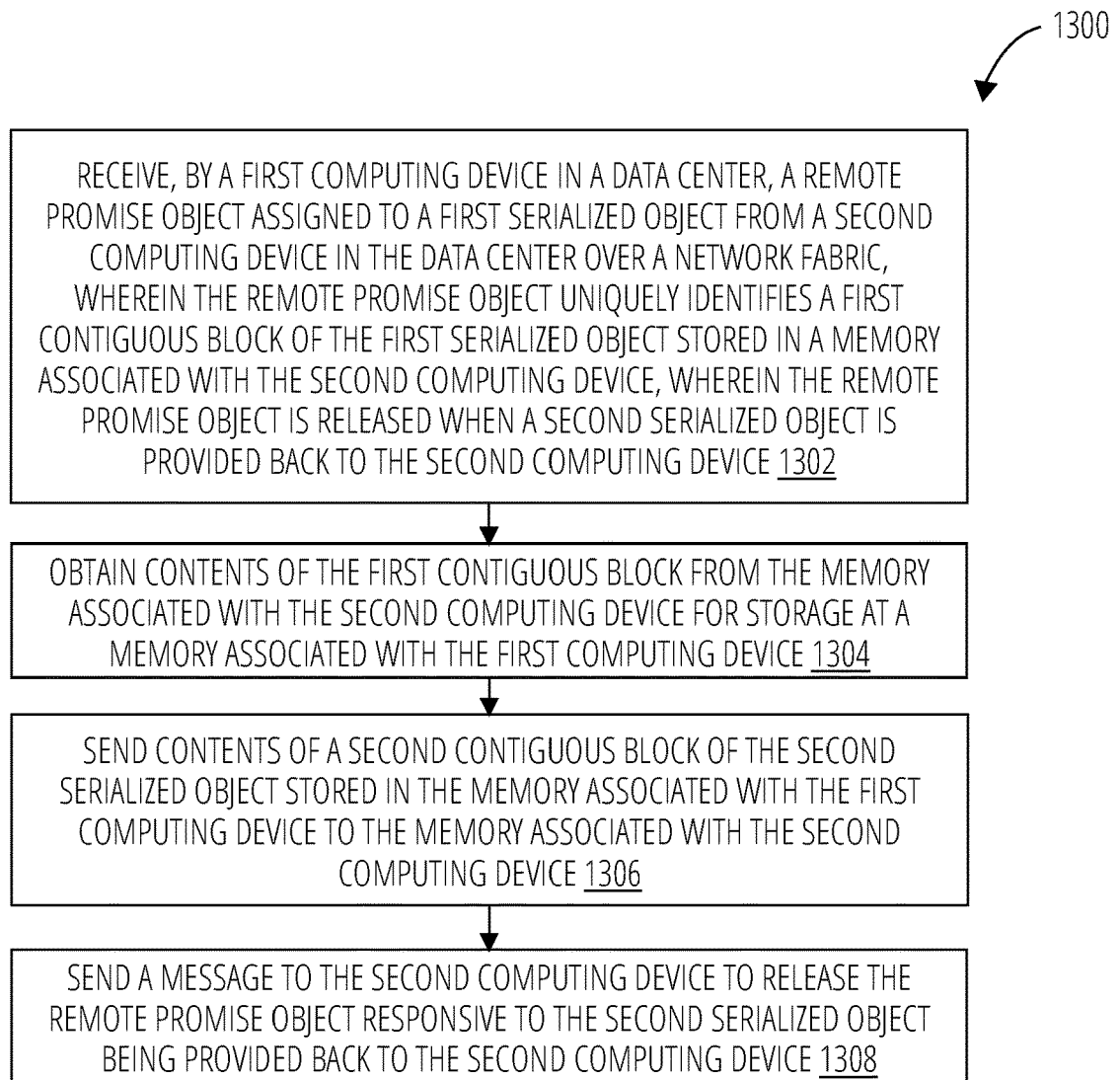
FIG. 13 is a flow diagram of a method of generating and sending a remote promise object, according to at least one embodiment.

FIG. 13 is a flow diagram of a method 1300 of generating and sending a remote promise object, according to at least one embodiment. In at least one embodiment, method 1300 may be performed by processing logic of a computing device, such as computing device 112, computing device 122, or the like. The processing logic can be a combination of hardware, firmware, software, or any combination thereof. Method 1300 may be performed by one or more data processing units (e.g., DPUs, CPUs, and/or GPUs), including (or communicating with) one or more memory devices. In at least one embodiment, the first physical machine 112 of FIG. 1 performs method 1300. In another embodiment, the physical machine B 110 of FIG. 1 performs the method 1400. In at least one embodiment, the physical machine A 302 of FIG. 3 performs method 1300. In another embodiment, the physical machine B of FIG. 3 performs the method 1300. In at least one embodiment, method 1300 may be performed by multiple processing threads, each thread executing one or more individual functions, routines, subroutines, or operations of the method. In at least one embodiment, processing threads implementing method 1300 may be synchronized (e.g., using semaphores, critical sections, and/or other thread synchronization logic). Alternatively, processing threads implementing method 1300 can be executed asynchronously with respect to each other. Various operations of method 1300 may be performed differently than the order shown in FIG. 13. Some operations of the methods may be performed concurrently with other operations. In at least one embodiment, one or more operations shown in FIG. 13 may not always be performed.

In block 1302, the processing logic of a first computing device in a data center receives a remote promise object (or a remote promise-future object) assigned to a first serialized object from a second computing device in the data center over a network fabric. The remote promise object uniquely identifies a first contiguous block of the first serialized object stored in a memory associated with the second computing device. The remote promise object is released when a second serialized object is provided back to the second computing device. In block 1304, the processing logic obtains contents of the first contiguous block from the memory associated with the second computing device for storage at a memory associated with the first computing device. In block 1306, the processing logic sends the contents of a second contiguous block of the second serialized object stored in the memory associated with the first computing device to the memory associated with the second computing device. In block 1308, the processing logic sends a message to the second computing device to release the remote promise object responsive to the second serialized object being provided back to the second computing device.

In another embodiment, the processing logic releases the remote promise object by sending the second serialized object back to the first computing device without sending the message in block 1308.

In a further embodiment, the remote promise object includes a starting address of the first contiguous block, a size of the first contiguous block, a physical machine identifier corresponding to the memory associated with the second computing device, an RDMA access key, and a value of a reference count token representing a share of ownership of the first serialized object.

In a further embodiment, the processing logic, by sending the message to the second computing device, causes the second computing device to update the value of the reference count token. The first serialized object is released from the memory associated with the first computing device responsive to the value of the reference count token satisfying a threshold value (e.g., equaling zero).

In a further embodiment, the processing logic can obtain the contents of the first contiguous block by performing, using the remote promise object, an RDMA GET operation to obtain the contents of the first contiguous block from the memory associated with the second computing device for transfer to the memory associated with the first computing device over the network fabric. The processing logic can send the contents of the second contiguous block by performing an RDMA put operation to send the contents of the second serialized object from the memory associated with the first computing device to the memory associated with the second computing device over the network fabric.

In a further embodiment, the processing logic can generate a second remote promise object. The second remote promise object is an object that uniquely identifies a third contiguous block of a third serialized object stored in the memory associated with the first computing device. The second remote promise object is released when a fourth serialized object is provided back to the first computing device. The processing logic can send the second remote promise object to another computing device in the data center over the network fabric. The processing logic can receive a second message from the other computing device to release the second remote promise object responsive to the fourth serialized object being provided back to the first computing device. In another embodiment, the processing logic can update the value of the reference count token responsive to receiving the second message. The processing logic can release the remote promise object from the first memory responsive to the value of the reference count token satisfying a threshold value.

Data Center

Figure 14:
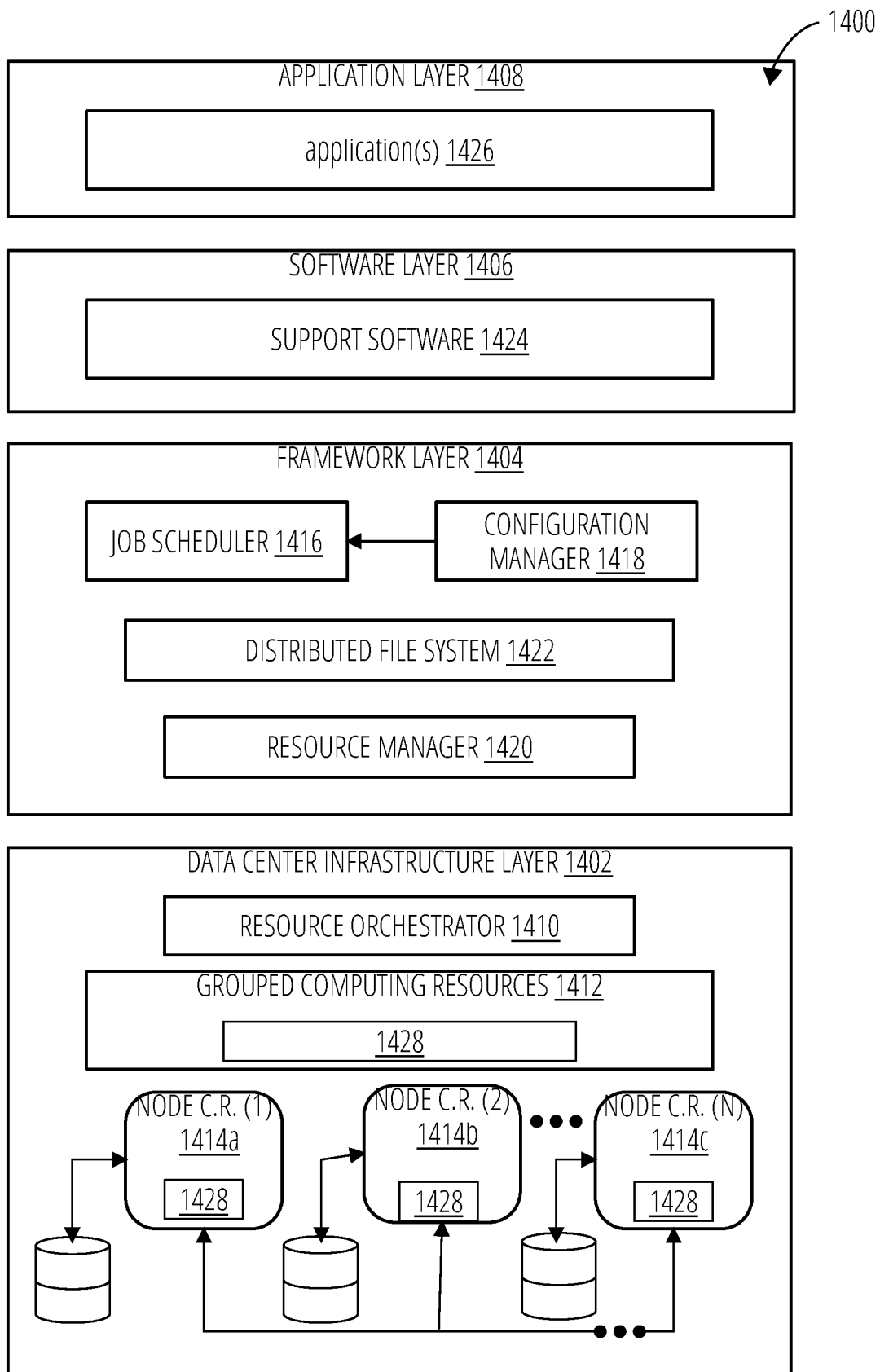
FIG. 14 illustrates an example data center system, according to at least one embodiment.

FIG. 14 illustrates an example data center 1400, in which at least one embodiment may be used. In at least one embodiment, data center 1400 includes a data center infrastructure layer 1402, a framework layer 1404, a software layer 1406, and an application layer 1408.

In at least one embodiment, as shown in FIG. 14, data center infrastructure layer 1402 may include a resource orchestrator 1410, grouped computing resources 1412, and node computing resources ("node C.R.s") 1414a(1)-1414c(N), where "N" represents any whole, positive integer. In at least one embodiment, node C.R.s 1414a(1)-1414c(N) may include, but are not limited to, any number of central processing units ("CPUs") or other processors (including accelerators, field-programmable gate arrays (FPGAs), graphics processors, etc.), memory devices (e.g., dynamic read-only memory), storage devices (e.g., solid-state or disk drives), network input/output ("NW I/O") devices, network switches, virtual machines ("VMs"), power modules, and cooling modules, etc. In at least one embodiment, one or more node C.R.s from among node C.R.s 1414a(1)-1414c(N) may be a server having one or more of the above-mentioned computing resources.

In at least one embodiment, grouped computing resources 1412 may include separate groupings of node C.R.s housed within one or more racks (not shown) or many racks housed in data centers at various geographical locations (also not shown). Separate groupings of node C.R.s within grouped computing resources 1412 may include grouped compute, network, memory, or storage resources that may be configured or allocated to support one or more workloads. In at least one embodiment, several node C.R.s, including CPUs or processors, may be grouped within one or more racks to provide compute resources to support one or more workloads. In at least one embodiment, one or more racks may also include any number of power modules, cooling modules, and network switches, in any combination.

In at least one embodiment, resource orchestrator 1410 may configure or otherwise control one or more node C.R.s 1414a(1)-1414c(N) and/or grouped computing resources 1412. In at least one embodiment, resource orchestrator 1410 may include a software design infrastructure ("SDI") management entity for data center 1400. In at least one embodiment, the resource orchestrator 1410 may include hardware, software, or some combination thereof.

In at least one embodiment, as shown in FIG. 14, framework layer 1404 includes a job scheduler 1416, a configuration manager 1418, a resource manager 1420, and a distributed file system 1422. In at least one embodiment, framework layer 1404 may include a framework to support software 1424 of software layer 1406 and/or one or more application(s) 1426 of application layer 1408. In at least one embodiment, support software 1424 or application(s) 1426 may respectively include web-based service software or applications, such as those provided by Amazon Web Services, Google Cloud, and Microsoft Azure. In at least one embodiment, framework layer 1406 may be, but is not limited to, a type of free and open-source software web application framework such as Apache Spark™ (hereinafter "Spark") that may utilize distributed file system 1422 for large-scale data processing (e.g., "big data"). In at least one embodiment, job scheduler 1416 may include a Spark driver to facilitate scheduling workloads supported by various layers of data center 1400. In at least one embodiment, configuration manager 1418 may be capable of configuring different layers, such as software layer 1406 and framework layer 1404, including Spark and distributed file system 1422 for supporting large-scale data processing. In at least one embodiment, resource manager 1420 may be capable of managing clustered or grouped computing resources mapped to or allocated for support of distributed file system 1422 and job scheduler 1416. In at least one embodiment, clustered or grouped computing resources may include grouped computing resources 1412 at data center infrastructure layer 1402. In at least one embodiment, resource manager 1420 may coordinate with resource orchestrator 1410 to manage these mapped or allocated computing resources.

In at least one embodiment, support software 1424 included in software layer 1406 may include software used by at least portions of node C.R.s 1414a(1)-1414c(N), grouped computing resources 1412, and/or distributed file system 1422 of framework layer 1404. One or more types of software may include, but are not limited to, Internet web page search software, e-mail virus scan software, database software, and streaming video content software. In at least one embodiment, application(s) 1426 included in application layer 1408 may include one or more types of applications used by at least portions of node C.R.s 1414*a*(1)-1414*c* (N), grouped computing resources 1412, and/or distributed file system 1422 of framework layer 1404. One or more types of applications may include, but are not limited to, any number of genomics applications, cognitive computing, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1418, resource manager 1420, and resource orchestrator 1410 may implement any number and type of self-modifying actions based on any amount and type of data acquired in any technically feasible fashion. In at least one embodiment, self-modifying actions may relieve a data center operator of data center 1400 from making possibly bad configuration decisions and possibly avoiding underutilized and/or poor performing portions of a data center.

In at least one embodiment, data center 1400 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1400. In at least one embodiment, trained machine learning models corresponding to one or more neural networks may be used to infer or predict information using resources described above with respect to data center 1400 by using weight parameters calculated through one or more training techniques described herein.

In at least one embodiment, data center 1400 may use CPUs, application-specific integrated circuits (ASICs), GPUs, FPGAs, or other hardware to perform training and/or inferencing using the above-described resources. Moreover, one or more software and/or hardware resources described above may be configured as a service to allow users to train or perform inferencing of information, such as image recognition, speech recognition, or other artificial intelligence services.

Transfer logic 1428 can be used to perform operations associated with remote descriptors, remote promise objects, remote promise-future objects, streaming batches, and RDMA operations associated with one or more embodiments. Details regarding transfer logic 1428 are provided below in conjunction with FIG. 1-FIG. 13. In at least one embodiment, transfer logic 1428 may be used in system FIG. 14 for enabling enable RDMA transport of serialized objects in streaming pipelines described herein. In at least one embodiment, transfer logic 1428 may be used in system FIG. 14 for batching remote descriptors to enable RDMA transport of serialized objects in streaming pipelines described herein. In at least one embodiment, transfer logic 1428 may be used in system FIG. 14 for enabling downstream nodes to obtain data from upstream storage and downstream nodes to PUSH data to upstream nodes while those upstream nodes yield their execution context and consume no resources until the downstream PUSH operation is completed as described herein.

Computer Systems

Figure 15:
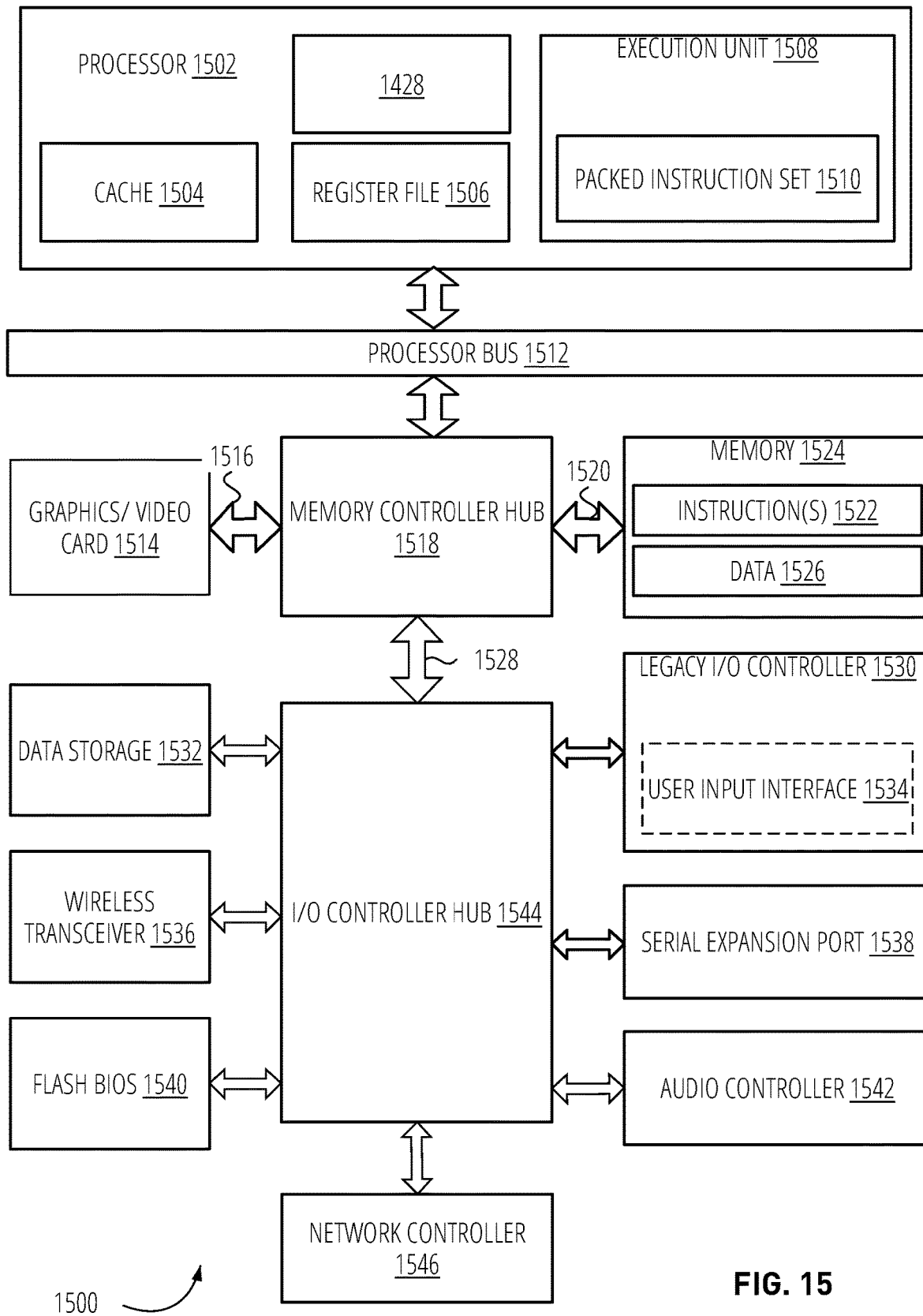
FIG. 15 illustrates a computer system, according to at least one embodiment.

FIG. 15 is a block diagram illustrating an exemplary computer system 1500, which may be a system with interconnected devices and components, a system-on-a-chip (SOC), or some combination thereof 1500 formed with a processor that may include execution units to execute an instruction, according to at least one embodiment. In at least one embodiment, computer system 1500 may include, without limitation, a component, such as a processor 1502, to employ execution units including logic to perform algorithms for process data, in accordance with the present disclosure, such as in the embodiments described herein. In at least one embodiment, computer system 1500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1500 may execute a version of WINDOWS' operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), a system on a chip, network computers ("NetPCs"), set-top boxes, network hubs, wide area network ("WAN") switches, or any other system that may perform one or more instructions in accordance with at least one embodiment.

In at least one embodiment, computer system 1500 may include, without limitation, processor 1502 that may include, without limitation, one or more execution units 1508 to perform operations according to techniques described herein. In at least one embodiment, computer system 1500 is a single-processor desktop or server system, but in another embodiment, computer system 1500 may be a multiprocessor system. In at least one embodiment, processor 1502 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1502 may be coupled to a processor bus 1512 that may transmit data signals between processor 1502 and other components in computer system 1500.

In at least one embodiment, processor 1502 may include, without limitation, a Level 1 ("L1") internal cache memory ("cache") 1504. In at least one embodiment, processor 1502 may have a single internal cache or multiple levels of internal cache. In at least one embodiment, the cache memory may reside external to processor 1502. Other embodiments may also include a combination of both internal and external caches depending on particular implementation and needs. In at least one embodiment, register file 1506 may store different types of data in various registers, including and without limitation, integer registers, floating-point registers, status registers, and instruction pointer registers.

In at least one embodiment, an execution unit 1508, including and without limitation, logic to perform integer and floating-point operations, also reside in processor 1502. In at least one embodiment, processor 1502 may also include a microcode ("ucode") read-only memory ("ROM") that stores microcode for certain macro instructions. In at least one embodiment, execution unit 1508 may include logic to handle a packed instruction set 1510. In at least one embodiment, by including packed instruction set 1510 in an instruction set of a general-purpose processor 1502, along with associated circuitry to execute instructions, operations used by many multimedia applications may be performed using packed data in a general-purpose processor 1502. In one or more embodiments, many multimedia applications may be accelerated and executed more efficiently by using the full width of a processor's data bus for performing operations on packed data, which may eliminate the need to transfer smaller units of data across the processor's data bus to perform one or more operations one data element at a time.

In at least one embodiment, execution unit 1508 may also be used in microcontrollers, embedded processors, graphics devices, DSPs, and other types of logic circuits. In at least one embodiment, computer system 1500 may include, without limitation, a memory 1524. In at least one embodiment, memory 1524 may be implemented as a Dynamic Random Access Memory ("DRAM") device, a Static Random Access Memory ("SRAM") device, a flash memory device, or other memory devices. In at least one embodiment, memory 1524 may store instruction(s) 1522 and/or data 1526 represented by data signals that may be executed by processor 1502.

In at least one embodiment, the system logic chip may be coupled to processor bus 1512 and memory 1524. In at least one embodiment, the system logic chip may include, without limitation, a memory controller hub ("MCH") 1518, and processor 1502 may communicate with MCH 1518 via processor bus 1512. In at least one embodiment, MCH 1518 may provide a high bandwidth memory path 1520 to memory 1524 for instruction and data storage and for storage of graphics commands, data, and textures. In at least one embodiment, MCH 1518 may direct data signals between processor 1502, memory 1524, and other components in computer system 1500 and bridge data signals between processor bus 1512, memory 1524, and a system I/O 1528. In at least one embodiment, a system logic chip may provide a graphics port for coupling to a graphics controller. In at least one embodiment, MCH 1518 may be coupled to memory 1524 through a high bandwidth memory path 1520, and graphics/video card 1514 may be coupled to MCH 1518 through an Accelerated Graphics Port ("AGP") interconnect 1516.

In at least one embodiment, computer system 1500 may use system I/O 1528 that is a proprietary hub interface bus to couple MCH 1518 to I/O controller hub ("ICH") 1544. In at least one embodiment, ICH 1544 may provide direct connections to some I/O devices via a local I/O bus. In at least one embodiment, a local I/O bus may include, without limitation, a high-speed I/O bus for connecting peripherals to memory 1524, chipset, and processor 1502. Examples may include, without limitation, an audio controller 1542, a firmware hub ("flash BIOS") 1540, a wireless transceiver 1536, data storage 1532, a legacy I/O controller 1530 containing user input and user input interface 1534, a serial expansion port 1538, such as Universal Serial Bus ("USB"), and a network controller 1546. Data storage 1532 may comprise a hard disk drive, a floppy disk drive, a CD-ROM device, a flash memory device, or other mass storage devices.

In at least one embodiment, FIG. 15 illustrates a system 1500, which includes interconnected hardware devices or "chips," whereas, in other embodiments, FIG. 15 may illustrate an exemplary System on a Chip ("SoC"). In at least one embodiment, devices may be interconnected with proprietary interconnects, standardized interconnects (e.g., PCIe), or some combination thereof. In at least one embodiment, one or more components of computer system 1500 are interconnected using compute express link (CXL) interconnects.

Transfer logic 1428 can be used to perform operations associated with remote descriptors, remote promise objects, remote promise-future objects, streaming batches, and RDMA operations associated with one or more embodiments. Details regarding transfer logic 1428 are provided below in conjunction with FIG. 1-FIG. 13. In at least one embodiment, transfer logic 1428 may be used in system FIG. 15 for enabling enable RDMA transport of serialized objects in streaming pipelines described herein. In at least one embodiment, transfer logic 1428 may be used in system FIG. 15 for batching remote descriptors to enable RDMA transport of serialized objects in streaming pipelines described herein. In at least one embodiment, transfer logic 1428 may be used in system FIG. 15 for enabling downstream nodes to obtain data from upstream storage and downstream nodes to PUSH data to upstream nodes while those upstream nodes yield their execution context and consume no resources until the downstream PUSH operation is completed as described herein.

Figure 16:
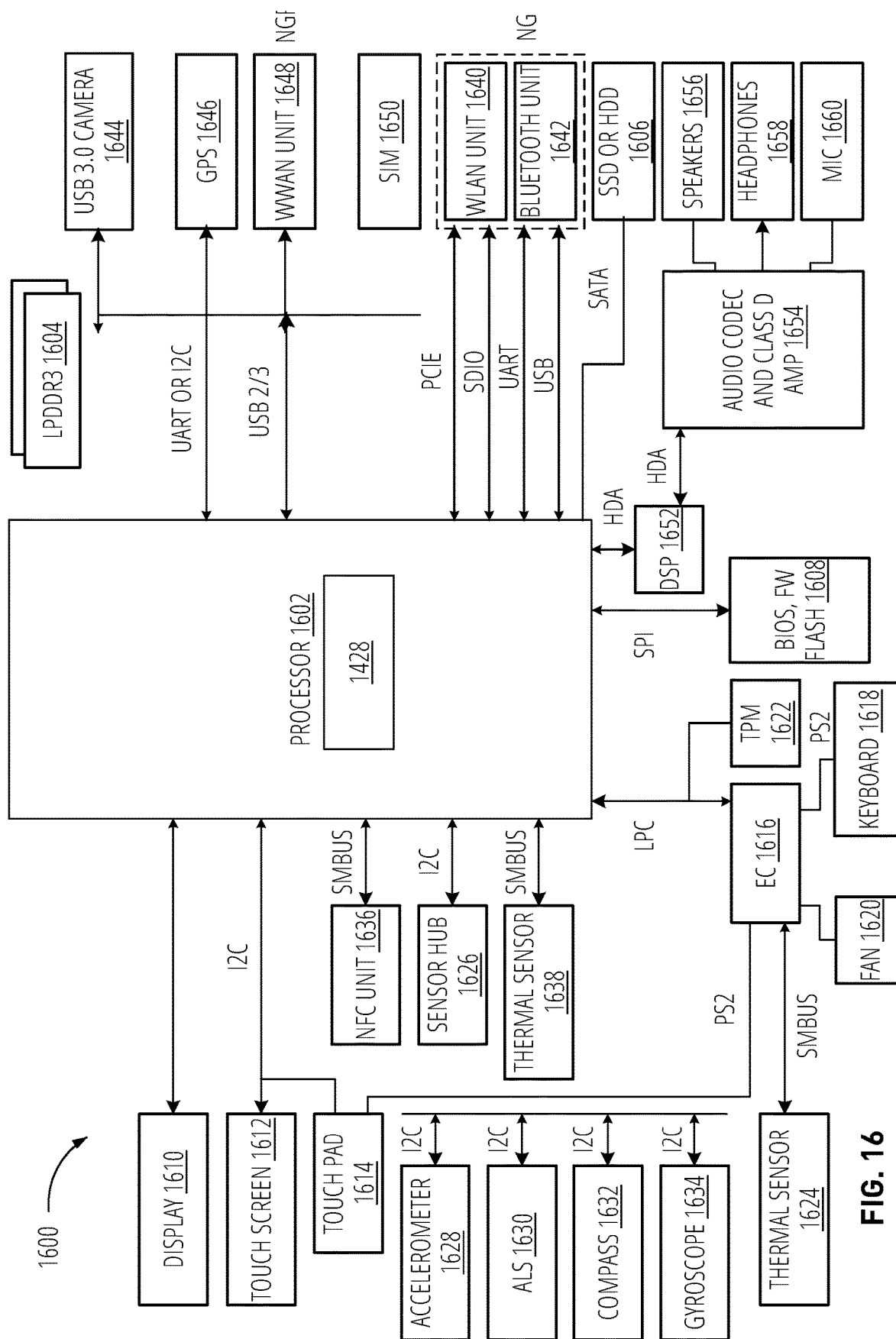
FIG. 16 illustrates a computer system, according to at least one embodiment.

FIG. 16 is a block diagram illustrating an electronic device 1600 for utilizing a processor 1610, according to at least one embodiment. In at least one embodiment, electronic device 1600 may be, for example, and without limitation, a notebook, a tower server, a rack server, a blade server, a laptop, a desktop, a tablet, a mobile device, a phone, an embedded computer, or any other suitable electronic device.

In at least one embodiment, system electronic device 1600 may include, without limitation, processor 1602 communicatively coupled to any suitable number or kind of components, peripherals, modules, or devices. In at least one embodiment, processor 1602 coupled using a bus or interface, such as an I2C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 16 illustrates a system, which includes interconnected hardware devices or "chips," whereas in other embodiments, FIG. 16 may illustrate an exemplary System on a Chip ("SoC"). In at least one embodiment, devices illustrated in FIG. 16 may be interconnected with proprietary interconnects, standardized interconnects (e.g., PCIe), or some combination thereof. In at least one embodiment, one or more components of FIG. 16 are interconnected using compute express link (CXL) interconnects.

In at least one embodiment, FIG. 16 may include a display 1610, a touch screen 1612, a touch pad 1614, a Near Field Communications unit ("NFC") 1636, a sensor hub 1626, a thermal sensor 1638, an Express Chipset ("EC") 1616, a Trusted Platform Module ("TPM") 1622, BIOS/firmware/ flash memory ("BIOS, firmware (FW) Flash") 1608, a DSP 1652, a drive 1606 such as a Solid State Disk ("SSD") or a Hard Disk Drive ("HDD"), a wireless local area network unit ("WLAN") 1640, a Bluetooth unit 1642, a Wireless Wide Area Network unit ("WWAN") 1648, a Global Positioning System (GPS) 1646, a camera ("USB 3.0 camera") 1644, such as a USB 3.0 camera, and/or a Low Power Double Data Rate ("LPDDR") memory unit ("LPDDR3") 1604 implemented in, for example, LPDDR3 standard. These components may each be implemented in any suitable manner.

In at least one embodiment, other components may be communicatively coupled to processor 1602 through the components discussed above. In at least one embodiment, an accelerometer 1628, Ambient Light Sensor ("ALS") 1630, compass 1632, and a gyroscope 1634 may be communicatively coupled to sensor hub 1626. In at least one embodiment, thermal sensor 1624, a fan 1620, a keyboard 1618, and a touch pad 1614 may be communicatively coupled to EC 1616. In at least one embodiment, speakers 1656, headphones 1658, and microphone ("mic") 1660 may be communicatively coupled to an audio unit ("audio codec and class d amp") 1654, which may, in turn, be communicatively coupled to DSP 1652. In at least one embodiment, audio unit 1654 may include, for example, and without limitation, an audio coder/decoder ("codec") and a class D amplifier. In at least one embodiment, SIM card ("SIM") 1650 may be communicatively coupled to WWAN unit 1648. In at least one embodiment, components such as WLAN unit 1640 and Bluetooth unit 1642, as well as WWAN unit 1648 may be implemented in a Next Generation Form Factor ("NGFF").

Transfer logic 1428 can be used to perform operations associated with remote descriptors, remote promise objects, remote promise-future objects, streaming batches, and RDMA operations associated with one or more embodiments. Details regarding transfer logic 1428 are provided below in conjunction with FIG. 1-FIG. 13. In at least one embodiment, transfer logic 1428 may be used in system FIG. 16 for enabling enable RDMA transport of serialized objects in streaming pipelines described herein. In at least one embodiment, transfer logic 1428 may be used in system FIG. 16 for batching remote descriptors to enable RDMA transport of serialized objects in streaming pipelines described herein. In at least one embodiment, transfer logic 1428 may be used in system FIG. 16 for enabling downstream nodes to obtain data from upstream storage and downstream nodes to PUSH data to upstream nodes while those upstream nodes yield their execution context and consume no resources until the downstream PUSH operation is completed as described herein.

Figure 17:
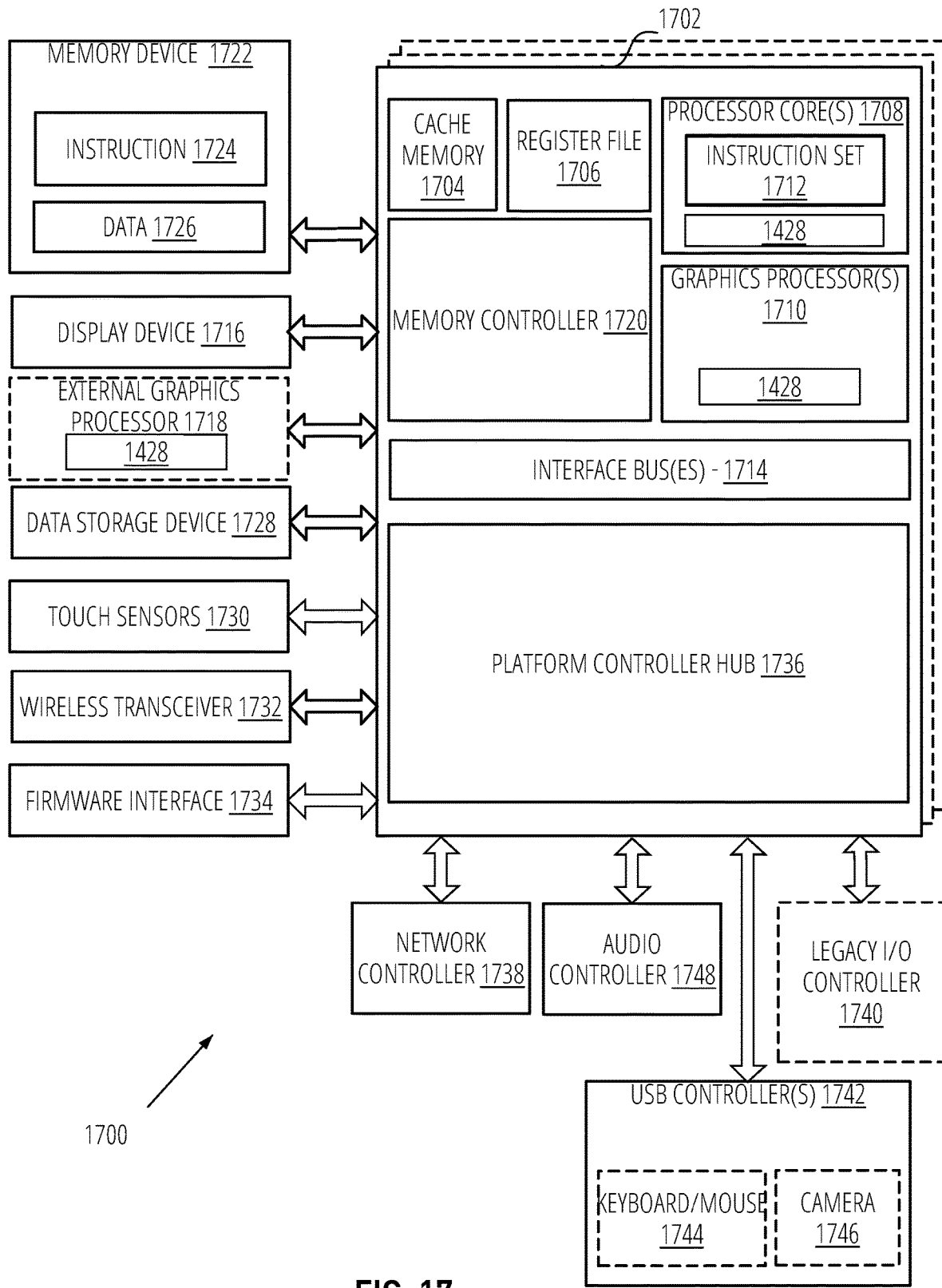
FIG. 17 illustrates at least portions of a graphics processor, according to one or more embodiments.

FIG. 17 is a block diagram of a processing system 1700, according to at least one embodiment. In at least one embodiment, the processing system 1700 includes one or more processor(s) 1702 and one or more graphics processor(s) 1710 and may be a single processor desktop system, a multiprocessor workstation system, or a server system having a large number of processor(s) 1702 or processor core(s) 1708. In at least one embodiment, the processing system 1700 is a processing platform incorporated within a system-on-a-chip (SoC) integrated circuit for use in mobile, handheld, or embedded devices.

In at least one embodiment, the processing system 1700 can include, or be incorporated within a server-based gaming platform, a game console, including a game and media console, a mobile gaming console, a handheld game console, or an online game console. In at least one embodiment, the processing system 1700 is a mobile phone, smart phone, tablet computing device, or mobile Internet device. In at least one embodiment, the processing system 1700 can also include, couple with, or be integrated within a wearable device, such as a smart watch wearable device, smart eyewear device, augmented reality device, or virtual reality device. In at least one embodiment, the processing system 1700 is a television or set-top box device having one or more processor(s) 1702 and a graphical interface generated by one or more graphics processor(s) 1710.

In at least one embodiment, one or more processor(s) 1702 each include one or more processor cores 1708 to process instructions which, when executed, perform operations for system and user software. In at least one embodiment, each of one or more processor core(s) 1708 is configured to process a specific instruction set 1709. In at least one embodiment, instruction set 1712 may facilitate Complex Instruction Set Computing (CISC), Reduced Instruction Set Computing (RISC), or computing via a Very Long Instruction Word (VLIW). In at least one embodiment, processor core(s) 1708 may each process a different instruction set 1712, which may include instructions to facilitate emulation of other instruction sets. In at least one embodiment, processor core(s) 1708 may also include other processing devices, such as a Digital Signal Processor (DSP).

In at least one embodiment, processor(s) 1702 includes cache memory 1704. In at least one embodiment, processor (s) 1708 can have a single internal cache or multiple levels of internal cache. In at least one embodiment, cache memory 1704 is shared among various components of processor(s) 1702. In at least one embodiment, processor(s) 1702 also uses an external cache (e.g., a Level-3 (L3) cache or Last Level Cache (LLC)) (not shown), which may be shared among processor core(s) 1708 using known cache coherency techniques. In at least one embodiment, register file 1706 is additionally included in processor(s) 1702, which may include different types of registers for storing different types of data (e.g., integer registers, floating-point registers, status registers, and an instruction pointer register). In at least one embodiment, register file 1706 may include general-purpose registers or other registers.

In at least one embodiment, one or more processor(s) 1702 are coupled with one or more interface bus(es) 1714 to transmit communication signals such as address, data, or control signals between processor core(s) 1708 and other components in processing system 1700. In at least one embodiment, interface bus(es)—1714, in one embodiment, can be a processor bus, such as a version of a Direct Media Interface (DMI) bus. In at least one embodiment, interface bus interface bus(es)—1714 is not limited to a DMI bus, and may include one or more Peripheral Component Interconnect buses (e.g., PCI, PCI Express), memory busses, or other types of interface busses. In at least one embodiment, processor(s) 1702 include an integrated memory controller 1720 and a platform controller hub 1736. In at least one embodiment, memory controller 1720 facilitates communication between a memory device and other components of the processing system 1700, while platform controller hub (PCH) 1736 provides connections to I/O devices via a local I/O bus.

In at least one embodiment, the memory device 1722 can be a dynamic random access memory (DRAM) device, a static random access memory (SRAM) device, a flash memory device, a phase-change memory device, or some other memory device having suitable performance to serve as process memory. In at least one embodiment, the memory device 1720 can operate as system memory for processing system 1700 to store data 1726 and instruction 1724 for use when one or more processor(s) 1702 executes an application or process. In at least one embodiment, memory controller 1720 also couples with an optional external graphics processor 1718, which may communicate with one or more graphics processor(s) 1710 in processor(s) 1702 to perform graphics and media operations. In at least one embodiment, a display device 1716 can connect to processor(s) 1702. In at least one embodiment, a display device 1716 can include one or more of an internal display device, as in a mobile electronic device or a laptop device, or an external display device attached via a display interface (e.g., DisplayPort, etc.). In at least one embodiment, display device 1716 can include a head-mounted display (HMD) such as a stereoscopic display device for use in virtual reality (VR) applications or augmented reality (AR) applications.

In at least one embodiment, the platform controller hub 1736 enables peripherals to connect to memory device 1722 and processor(s) 1702 via a high-speed I/O bus. In at least one embodiment, I/O peripherals include, but are not limited to, an audio controller 1748, a network controller 1738, a firmware interface 1734, a wireless transceiver 1732, touch sensors 1730, a data storage device 1728 (e.g., hard disk drive, flash memory, etc.). In at least one embodiment, the data storage device 1728 can connect via a storage interface (e.g., SATA) or via a peripheral bus, such as a Peripheral Component Interconnect bus (e.g., PCI, PCI Express). In at least one embodiment, touch sensors 1730 can include touch screen sensors, pressure sensors, or fingerprint sensors. In at least one embodiment, wireless transceiver 1732 can be a Wi-Fi transceiver, a Bluetooth transceiver, or a mobile network transceiver such as a 3G, 4G, or Long Term Evolution (LTE) transceiver. In at least one embodiment, firmware interface 1734 enables communication with system firmware and can be, for example, a unified extensible firmware interface (UEFI). In at least one embodiment, the network controller 1734 can enable a network connection to a wired network. In at least one embodiment, a high-performance network controller (not shown) couples with interface bus(es)—1714. In at least one embodiment, audio controller 1748 is a multi-channel high definition audio controller. In at least one embodiment, the processing system 1700 includes an optional legacy i/o controller 1740 for coupling legacy (e.g., Personal System 2 (PS/2)) devices to the processing system 1700. In at least one embodiment, platform controller hub 1736 can also connect to one or more Universal Serial Bus (USB) controllers 1742 connect input devices, such as keyboard and mouse 1744 combinations, a camera 1746, or other USB input devices.

In at least one embodiment, an instance of memory controller 1720 and platform controller hub 1736 may be integrated into a discreet external graphics processor, such as external graphics processor 1718. In at least one embodiment, the platform controller hub 1736 and/or memory controller 1720 may be external to one or more processor(s) 1702. For example, in at least one embodiment, the processing system 1700 can include an external memory controller 1720 and platform controller hub 1736, which may be configured as a memory controller hub and peripheral controller hub within a system chipset that is in communication with the processor(s) 1702.

Transfer logic 1428 can be used to perform operations associated with remote descriptors, remote promise objects, remote promise-future objects, streaming batches, and RDMA operations associated with one or more embodiments. Details regarding transfer logic 1428 are provided below in conjunction with FIG. 1-FIG. 13. In at least one embodiment, portions or all of transfer logic 1428 may be incorporated into graphics processor(s) 1710. In at least one embodiment, transfer logic 1428 may be used in system FIG. 17 for enabling enable RDMA transport of serialized objects in streaming pipelines described herein. In at least one embodiment, transfer logic 1428 may be used in system FIG. 17 for batching remote descriptors to enable RDMA transport of serialized objects in streaming pipelines described herein. In at least one embodiment, transfer logic 1428 may be used in system FIG. 17 for enabling downstream nodes to obtain data from upstream storage and downstream nodes to PUSH data to upstream nodes while those upstream nodes yield their execution context and consume no resources until the downstream PUSH operation is completed as described herein.

Figure 18:
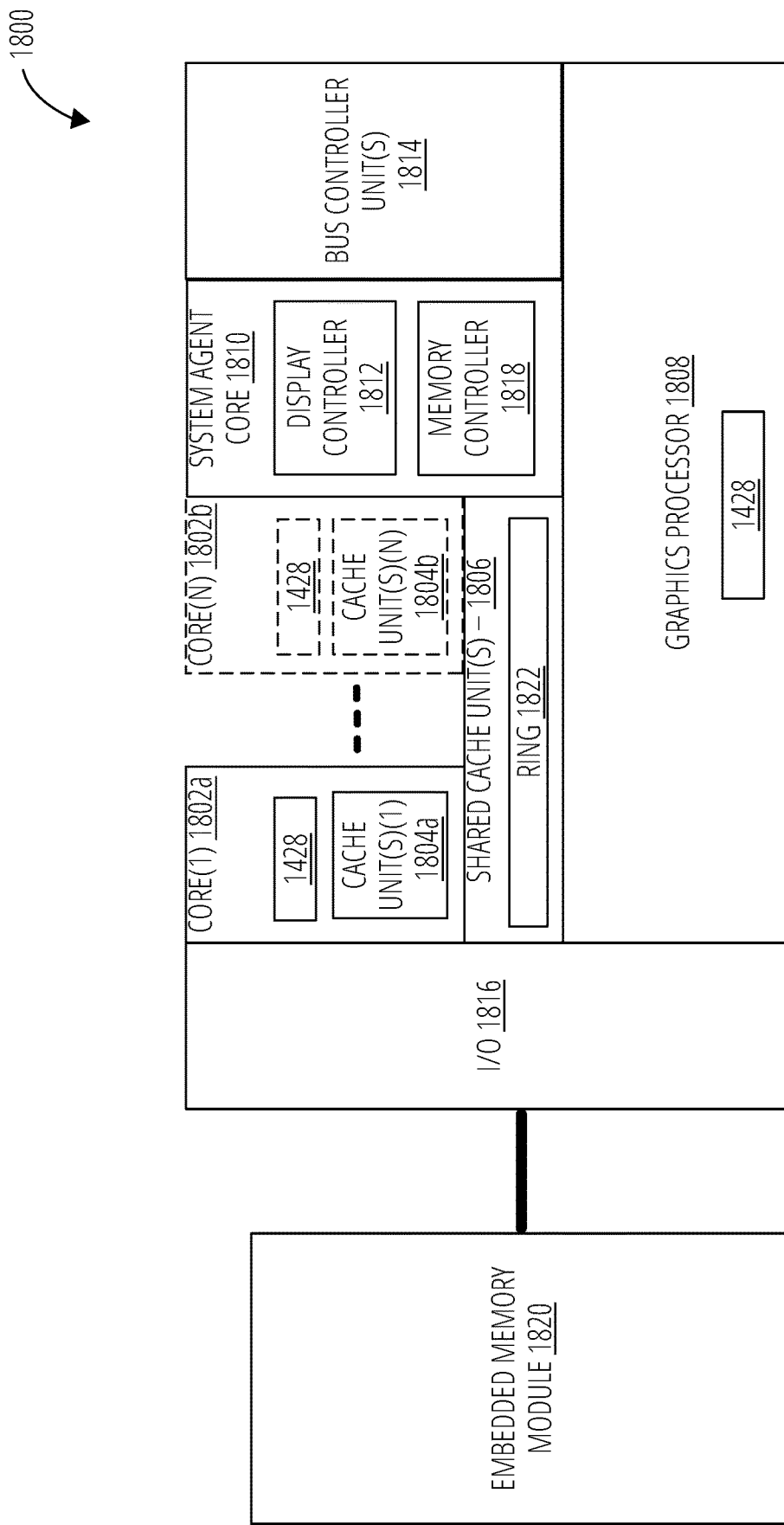
FIG. 18 illustrates at least portions of a graphics processor, according to one or more embodiments.

FIG. 18 is a block diagram of a processor 1800 having one or more processor core(1) 1802*a*-core(N) 1802*b*, an integrated memory controller 1818, and an integrated graphics processor 1808, according to at least one embodiment. In at least one embodiment, processor 1800 can include additional cores up to and including additional core(N) 1802*b* represented by dashed lined boxes. In at least one embodiment, each of processor core(1) 1802*a*-core(N) 1802*b* includes one or more internal cache unit(s)(1) 1804*a*-cache unit(s)(N) 1804*b*. In at least one embodiment, each processor core also has access to one or more shared cached units 1806.

In at least one embodiment, internal cache unit(s)(1) 1804*a*-cache unit(s)(N) 1804*b* and shared cache units 1806 represent a cache memory hierarchy within processor 1800. In at least one embodiment, cache unit(s)(1) 1804*a*-cache unit(s)(N) 1804*b* may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1806 and cache unit(s)(1) 1804*a*-cache unit(s)(N) 1804*b*.

In at least one embodiment, processor 1800 may also include a set of one or more bus controller unit(s) 1814 and a system agent core 1810. In at least one embodiment, one or more bus controller unit(s) 1814 manage a set of peripheral buses, such as one or more PCI or PCI express busses. In at least one embodiment, system agent core 1810 provides management functionality for various processor components. In at least one embodiment, system agent core 1810 includes one or more integrated memory controller 1818 to manage access to various external memory devices (not shown).

In at least one embodiment, one or more of processor core(1) 1802*a*-core(N) 1802*b* include support for simultaneous multi-threading. In at least one embodiment, system agent core 1810 includes components for coordinating and operating processor core(1) 1802*a*-core(N) 1802*b* during multi-threaded processing. In at least one embodiment, system agent core 1810 may additionally include a power control unit (PCU), which includes logic and components to regulate one or more power states of processor core(1) 1802*a*-core(N) 1802*b* and graphics processor 1808.

In at least one embodiment, processor 1800 additionally includes graphics processor 1808 to execute graphics processing operations. In at least one embodiment, graphics processor 1808 couples with shared cache units 1806, and system agent core 1810, including one or more integrated memory controllers 1822. In at least one embodiment, system agent core 1810 also includes a display controller

1812 to drive graphics processor output to one or more coupled displays. In at least one embodiment, display controller 1812 may also be a separate module coupled with graphics processor 1808 via at least one interconnect, or may be integrated within graphics processor 1808.

In at least one embodiment, a ring-based interconnect unit 1822 is used to couple internal components of processor 1800. In at least one embodiment, an alternative interconnect unit may be used, such as a point-to-point interconnect, a switched interconnect, or other techniques. In at least one embodiment, graphics processor 1808 couples with ring-based interconnect unit 1822 via an I/O link 1816.

In at least one embodiment, I/O link 1816 represents at least one of multiple varieties of I/O interconnects, including an on package I/O interconnect, which facilitates communication between various processor components and a high-performance embedded memory module 1820, such as an eDRAM module. In at least one embodiment, each of processor core(1) 1802a-core(N) 1802b and graphics processor 1808 use embedded memory module 1820 as a shared Last Level Cache.

In at least one embodiment, processor core(1) 1802a-core(N) 1802b are homogenous cores executing a common instruction set architecture. In at least one embodiment, processor core(1) 1802a-core(N) 1802b are heterogeneous in terms of instruction set architecture (ISA), where one or more of processor core(1) 1802a-core(N) 1802b execute a common instruction set, while one or more other cores of processor core(1) 1802a-core(N) 1802b executes a subset of a common instruction set or a different instruction set. In at least one embodiment, processor core(1) 1802a-core(N) 1802b are heterogeneous in terms of microarchitecture, where one or more cores have a relatively higher power consumption couple with one or more power cores having a lower power consumption. In at least one embodiment, processor 1800 can be implemented on one or more chips or as an SoC integrated circuit.

Transfer logic 1428 can be used to perform operations associated with remote descriptors, remote promise objects, remote promise-future objects, streaming batches, and RDMA operations associated with one or more embodiments. Details regarding transfer logic 1428 are provided below in conjunction with FIG. 1-FIG. 13. In at least one embodiment, portions or all of transfer logic 1428 may be incorporated into processor 1800. For example, in at least one embodiment, training and/or inferencing techniques described herein may use one or more arithmetic-logic units (ALUs) embodied in graphics processor 1808, processor core(1) 1802a-core(N) 1802b, or other components in FIG. 18. In at least one embodiment, transfer logic 1428 may be used in system FIG. 18 for enabling enable RDMA transport of serialized objects in streaming pipelines described herein. In at least one embodiment, transfer logic 1428 may be used in system FIG. 18 for batching remote descriptors to enable RDMA transport of serialized objects in streaming pipelines described herein. In at least one embodiment, transfer logic 1428 may be used in system FIG. 18 for enabling downstream nodes to obtain data from upstream storage and downstream nodes to PUSH data to upstream nodes while those upstream nodes yield their execution context and consume no resources until the downstream PUSH operation is completed as described herein.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Any recitation of ranges of values herein is merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions, and a main central processing unit ("CPU") executes some of the instructions while a graphics processing unit ("GPU") executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulates and/or transforms data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or interprocess communication mechanism.

Although the discussion above sets forth example implementations of described techniques, other architectures may be used to implement described functionality, and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method of operating a first computing device, the method comprising:
  generating a first streaming batch of a plurality of remote descriptors, each of the plurality of remote descriptors being an object that uniquely identifies a contiguous block of a serialized object stored in a first memory associated with the first computing device;
  sending at least one of the plurality of remote descriptors to a second computing device before the first streaming batch is completed, wherein at least some contents of at least one of the contiguous blocks are obtained from the first memory for storage at a second memory associated with the second computing device before the first streaming batch is completed; and completing the first streaming batch responsive to i) each of a plurality of slots of the first streaming batch being assigned one of the plurality of remote descriptors or ii) a first timing window ending.

2. The method of claim 1, wherein generating the first streaming batch comprises:
assigning a first remote descriptor of the plurality of remote descriptors to a first slot of the first streaming batch during the first timing window, wherein the first remote descriptor is an object that uniquely identifies a first contiguous block of a first serialized object stored in the first memory associated with the first computing device; and
assigning a second remote descriptor of the plurality of remote descriptors to a second slot of the first streaming batch during the first timing window, wherein the second remote descriptor is an object that uniquely identifies a second contiguous block of a second serialized object stored in the first memory;
sending the at least one of the plurality of remote descriptors to the second computing device comprises:
sending the first remote descriptor to the second computing device before the first streaming batch is completed; and
sending the second remote descriptor to the second computing device before the first streaming batch is completed,
wherein the second computing device is to obtain at least some contents of the first contiguous block from the first memory for storage at the second memory associated with the second computing device before the first streaming batch is completed.

3. The method of claim 2, wherein the first remote descriptor comprises a starting address of the first contiguous block, a size of the first contiguous block, a physical machine identifier corresponding to the first memory, a remote direct memory access (RDMA) access key, and a value of a reference count token representing one or more shares of ownership of the first serialized object, wherein a size of the first remote descriptor is less than the size of the first contiguous block.

4. The method of claim 3, further comprising:
receiving a first message from the second computing device to release the first remote descriptor;
updating the value of the reference count token responsive to receiving the first message; and
releasing the first serialized object from the first memory responsive to the value of the reference count token satisfying a threshold value.

5. The method of claim 2, further comprising:
initializing the first streaming batch comprising a specified number of the plurality of slots, each of the plurality of slots corresponding to an individual streaming batch item, wherein the first timing window starts responsive to a first streaming batch item being assigned to the first streaming batch, and wherein the obtained contents of the first contiguous block are processed by the second computing device once the first streaming batch is completed.

6. The method of claim 2, further comprising:
receiving a third remote descriptor associated with a second streaming batch during a second timing window, wherein the third remote descriptor is a second object that uniquely identifies a third contiguous block of a third serialized object stored in a third memory associated with a third computing device; and
performing, using the third remote descriptor, an RDMA GET operation to obtain at least some contents of the third contiguous block from the third memory for transfer to the first memory.

7. The method of claim 6, wherein receiving the second remote descriptor comprises receiving the second remote descriptor from a fourth computing device.

8. The method of claim 6, further comprising:
sending a second message to the third computing device to release the third remote descriptor, wherein:
the third remote descriptor comprises a starting address of the third contiguous block, a size of the third contiguous block, a physical machine identifier corresponding to the third memory, an RDMA access key, and a value of a reference count token representing one or more shares of ownership of the third serialized object, wherein a size of the third remote descriptor is less than the size of the third contiguous block; and
the value of the reference count token is updated in response to the second message, wherein the second serialized object is released responsive to the value of the reference count token satisfying a threshold value.

9. A computing system comprising:
a first computing device; and
a first memory coupled to the first computing device, wherein the first computing device is to:
generate a first streaming batch of a plurality of remote descriptors, each of the plurality of remote descriptors being an object that uniquely identifies a contiguous block of a serialized object stored in a first memory associated with the first computing device;
send at least one of the plurality of remote descriptors to a second computing device before the first streaming batch is completed, wherein at least some contents of at least one of the contiguous blocks are obtained from the first memory for storage at a second memory associated with the second computing device before the first streaming batch is completed; and
complete the first streaming batch responsive to i) each of a plurality of slots of the first streaming batch being assigned one of the plurality of remote descriptors or ii) a first timing window ending.

10. The computing system of claim 9, wherein:
the first computing device, to generate the first streaming batch, is further to:
assign a first remote descriptor of the plurality of remote descriptors to a first slot of the first streaming batch during a first timing window, wherein the first remote descriptor is an object that uniquely identifies a first contiguous block of a first serialized object stored in the first memory associated with the first computing device; and
assign a second remote descriptor of the plurality of remote descriptors to a second slot of the first streaming batch during the first timing window, wherein the second remote descriptor is an object that uniquely identifies a second contiguous block of a second serialized object stored in the first memory;
the first computing device, to send the at least one of the plurality of remote descriptors to the second computing device, is further to:

send the first remote descriptor to the second computing device before the first streaming batch is completed; and send the second remote descriptor to the second computing device the first streaming batch is completed, wherein the second computing device is to obtain at least some contents of the first contiguous block from the first memory for storage at the second memory associated with the second computing device before the first streaming batch is completed.

11. The computing system of claim 10, wherein the first remote descriptor comprises a starting address of the first contiguous block, a size of the first contiguous block, a physical machine identifier corresponding to the first memory, a remote direct memory access (RDMA) access key, and a value of a reference count token representing one or more shares of ownership of the first serialized object, wherein a size of the first remote descriptor is less than the size of the first contiguous block.

12. The computing system of claim 11, wherein the first computing device is further to:
receive a first message from the second computing device to release the first remote descriptor;
update the value of the reference count token responsive to receiving the first message; and
release the first serialized object from the first memory responsive to the value of the reference count token satisfying a threshold value.

13. The computing system of claim 10, wherein the first computing device is further to:
initialize the first streaming batch comprising a specified number of slots, each slot corresponding to an individual streaming batch item, wherein the first timing window starts responsive to a first streaming batch item being assigned to the first streaming batch, and wherein the obtained contents of the first contiguous block are processed by the second computing device once the first streaming batch is completed.

14. The computing system of claim 10, wherein the first computing device is further to:
receive a third remote descriptor associated with a second streaming batch during a second timing window, wherein the third remote descriptor is a second object that uniquely identifies a third contiguous block of a third serialized object stored in a third memory associated with a third computing device; and
perform, using the third remote descriptor, an RDMA GET operation to obtain at least some contents of the third contiguous block from the third memory for transfer to the first memory.

15. The computing system of claim 14, wherein the first computing device is to receive the second remote descriptor from a fourth computing device.

16. The computing system of claim 14, wherein the first computing device is further to:
send a second message to the third computing device to release the second remote descriptor, wherein:
the third remote descriptor comprises a starting address of the second contiguous block, a size of the third contiguous block, a physical machine identifier corresponding to the third memory, an RDMA access key, and a value of a reference count token representing one or more shares of ownership of the third serialized object, wherein a size of the third remote descriptor is less than the size of the third contiguous block; and the value of the reference count token of the third remote descriptor is updated in response to the second message, wherein the third serialized object is released responsive to the value of the reference count token of the third remote descriptor satisfying a threshold value.

17. A data center comprising:
a plurality of computing devices;
a plurality of memories, each memory being associated as local memory to one of the plurality of computing devices; and
a network fabric coupled to the plurality of computing devices, wherein a first computing device of the plurality of computing devices is to:
generate a first streaming batch of a plurality of remote descriptors, each of the plurality of remote descriptors being an object that uniquely identifies a contiguous block of a serialized object stored in a first memory associated with the first computing device;
send at least one of the plurality of remote descriptors to a second computing device over the network fabric before the first streaming batch is completed, wherein at least some contents of at least one of the contiguous blocks are obtained from the first memory for storage at a second memory associated with the second computing device before the first streaming batch is completed; and
complete the first streaming batch responsive to i) all slots of the first streaming batch being assigned one of the plurality of remote descriptors, or ii) a first timing window ending.

18. The data center of claim 17, wherein:
the first computing device, to generate the first streaming batch, is further to:
assign a first remote descriptor of the plurality of remote descriptors to a first slot of the first streaming batch during a first timing window, wherein the first remote descriptor is an object that uniquely identifies a first contiguous block of a first serialized object stored in a first memory associated with the first computing device; and
assign a second remote descriptor of the plurality of remote descriptors to a second slot of the first streaming batch during the first timing window, wherein the second remote descriptor is an object that uniquely identifies a second contiguous block of a second serialized object stored in the first memory;
the first computing device, to send the at least one of the plurality of remote descriptors to a second computing device, is further to:
send the first remote descriptor to the second computing device in the data center over the network fabric before the first streaming batch is completed; and
send the second remote descriptor to the second computing device over the network fabric before the first streaming batch is completed,
wherein the second computing device is to obtain at least some contents of the first contiguous block from the first memory for storage at a second memory associated with the second computing device before the first streaming batch is completed.

19. The data center of claim 18, wherein the first remote descriptor comprises a starting address of the first contiguous block, a size of the first contiguous block, a physical machine identifier corresponding to the first memory, a remote direct memory access (RDMA) access key, and a value of a reference count token representing one or more shares of ownership of the first serialized object, wherein a size of the first remote descriptor is less than the size of the first contiguous block.

20. The data center of claim 19, wherein the first computing device is further to:
   receive a first message from the second computing device to release the first remote descriptor;
   update the value of the reference count token responsive to receiving the first message; and
   release the first serialized object from the first memory responsive to the value of the reference count token satisfying a threshold value.

21. The data center of claim 18, wherein the first computing device is further to:
   initialize the first streaming batch comprising a specified number of slots, each slot corresponding to an individual streaming batch item, wherein the first timing window starts responsive to a first streaming batch item being assigned to the first streaming batch, and wherein the obtained contents of the first contiguous block are processed by the second computing device once the first streaming batch is completed.

22. The data center of claim 18, wherein the first computing device is further to:
   receive a third remote descriptor associated with a second streaming batch during a second timing window, wherein the third remote descriptor is a second object that uniquely identifies a third contiguous block of a third serialized object stored in a third memory associated with a third computing device in the data center; and
   perform, using the third remote descriptor, an RDMA GET operation to obtain at least some contents of the third contiguous block from the third memory for transfer to the first memory over the network fabric.

23. The data center of claim 22, wherein the first computing device is to receive the second remote descriptor from a fourth computing device over the network fabric.

24. The data center of claim 22, wherein the first computing device is further to:
   send a second message to the third computing device over the network fabric to release the second remote descriptor, wherein:
      the second remote descriptor comprises a starting address of the second contiguous block, a size of the second contiguous block, a physical machine identifier corresponding to the third memory, an RDMA access key, and a value of a reference count token representing one or more shares of ownership of the third serialized object, wherein a size of the second remote descriptor is less than the size of the third contiguous block; and
      the value of the reference count token is updated in response to the second message, wherein the second serialized object is released responsive to the value of the reference count token satisfying a threshold value.

* * * * *